United States Patent
Carbune et al.

(10) Patent No.: US 12,332,074 B1
(45) Date of Patent: Jun. 17, 2025

(54) MACHINE-LEARNED FOUNDATIONAL MODELS FOR EMULATING CONVERSATIONAL INTERACTIONS BETWEEN POINTS OF INTEREST

(71) Applicant: Google LLC, Mountain View, CA (US)

(72) Inventors: Victor Carbune, Zurich (CH); Kevin Allekotte, Zurich (CH); Haroon Baig, Zurich (CH); Paula Marques Fernandes, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/640,952

(22) Filed: Apr. 19, 2024

(51) Int. Cl.
*G01C 21/36* (2006.01)
*H04L 51/02* (2022.01)

(52) U.S. Cl.
CPC .......... *G01C 21/3682* (2013.01); *H04L 51/02* (2013.01)

(58) Field of Classification Search
CPC ............................ G01C 21/3682; H04L 51/02
USPC ......................................................... 701/426
See application file for complete search history.

(56) References Cited

U.S. PATENT DOCUMENTS

| | | | | |
|---|---|---|---|---|
| 2012/0036467 A1* | 2/2012 | Tom | ..................... | G06Q 10/047 715/772 |
| 2015/0213127 A1* | 7/2015 | Chang | ................. | G06F 16/9038 707/722 |
| 2020/0340822 A1* | 10/2020 | Shelby | ................. | G09B 29/102 |
| 2021/0356290 A1* | 11/2021 | Zhou | ................... | G01C 21/3617 |
| 2022/0205797 A1* | 6/2022 | Li Voti | ............... | G06Q 30/0277 |
| 2022/0248170 A1* | 8/2022 | Zhao | ..................... | G06Q 10/063 |
| 2022/0397408 A1* | 12/2022 | Bahnsen | ............ | G01C 21/3484 |
| 2024/0361149 A1* | 10/2024 | Sharifi | ............... | G01C 21/3438 |

FOREIGN PATENT DOCUMENTS

WO   WO-2022086528 A1 *  4/2022  ......... G01C 21/3629

OTHER PUBLICATIONS

D.D. Dhananjaya et al., "Enhancing the POI data for trip purpose inference using machine learning techniques," 2022, Publisher: IEEE.*
Hosam et al., "Distinguishing Human-Written and ChatGPT-Generated Text Using Machine Learning," 2023, Publisher: IEEE.*

* cited by examiner

*Primary Examiner* — Tuan C To
(74) *Attorney, Agent, or Firm* — DORITY & MANNING P.A.

(57) ABSTRACT

Information indicative of a particular geographic area in which a user computing device is located is obtained, wherein the particular geographic area comprises a plurality of Points of Interest (POIs). For a first POI of the plurality of POIs, a first set of textual content is generated with a first machine-learned POI-specific language model configured to generate textual content from a perspective of the first POI. For a second POI of the plurality of POIs, a second set of textual content is generated with a second machine-learned POI-specific language model configured to generate textual content from a perspective of the second POI. At least some of the second set of textual content is provided to the user computing device.

20 Claims, 10 Drawing Sheets

MACHINE-LEARNED FOUNDATIONAL MODELS FOR EMULATING CONVERSATIONAL INTERACTIONS BETWEEN POINTS OF INTEREST

FIELD

The present disclosure relates generally to providing information via emulated conversations. More particularly, the present disclosure relates to machine-learned models, such as Large Language Models (LLMs), trained to emulate conversations from the perspectives of various Points of Interest (POIs).

BACKGROUND

Conventional navigation services include routing features to route a user from a starting location to a desired Point of Interest (POI). In some instances, navigation services will also offer supplemental features to aid users in discovering new POIs to visit. Specifically, some navigation services store "profiles" for POIs that include information related to the particular POI. Examples of information stored to POI profiles include user-generated content (e.g., reviews, images, video, etc.), POI-specific information (e.g., store hours, location, average wait times, etc.), etc. Users of these navigation services can browse POI profiles to select a POI they wish to visit. In such fashion, navigation services and other related services (e.g., mapping services, visual search services, etc.) can facilitate the discovery of new POIs for users to visit.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a computing system comprising one or more processor devices, information indicative of a particular geographic area in which a user computing device is located, wherein the particular geographic area comprises a plurality of Points of Interest (POIs). The method includes, for a first POI of the plurality of POIs, generating, by the computing system, a first set of textual content with a first machine-learned POI-specific language model configured to generate textual content from a perspective of the first POI. The method includes, for a second POI of the plurality of POIs, generating, by the computing system, a second set of textual content with a second machine-learned POI-specific language model configured to generate textual content from a perspective of the second POI. The method includes providing, by the computing system, at least some of the second set of textual content to the user computing device.

Another example aspect of the present disclosure is directed to one or more tangible, non-transitory computer readable media storing computer-readable instructions that when executed by one or more processor devices cause the one or more processor devices to perform operations. The operations include obtaining information indicative of a particular geographic area from a user computing device, wherein the particular geographic area comprises a plurality of POIs. The operations include, for a first POI of the plurality of POI, generating a first set of textual content with a first machine-learned POI-specific language model configured to generate textual content from a perspective of the first POI. The operations include, for a second POI of the plurality of POIs, generating a second set of textual content with a second machine-learned POI-specific language model configured to generate textual content from a perspective of the second POI. The operations include providing at least some of the second set of textual content to the user computing device.

Another example aspect of the present disclosure is directed to a user computing device. The user computing device includes or more processor devices and one or more tangible, non-transitory computer readable media storing computer-readable instructions that when executed by the one or more processor devices cause the one or more processor devices to perform operations. The operations include receiving a user input via an application executed by the user computing device, wherein the user input is indicative of a particular geographic area, and wherein the particular geographic area comprises a plurality of POIs. The operations include sending information indicative of the particular geographic area to a computing system associated with the application. The operations include, responsive to sending the information, obtaining a set of textual content generated with a machine-learned POI-specific language model optimized to generate textual content from a perspective of a POI of the plurality of POIs. The operations include displaying a message that comprises at least some of the set of textual content within a chat interface of the application executed by the user computing device, wherein the chat interface comprises a POI representation that represents the POI as a chat participant within the chat interface, wherein the POI representation comprises a representative POI image visually indicative of the POI, and wherein the message is depicted within the chat interface as being sent by the POI representation.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
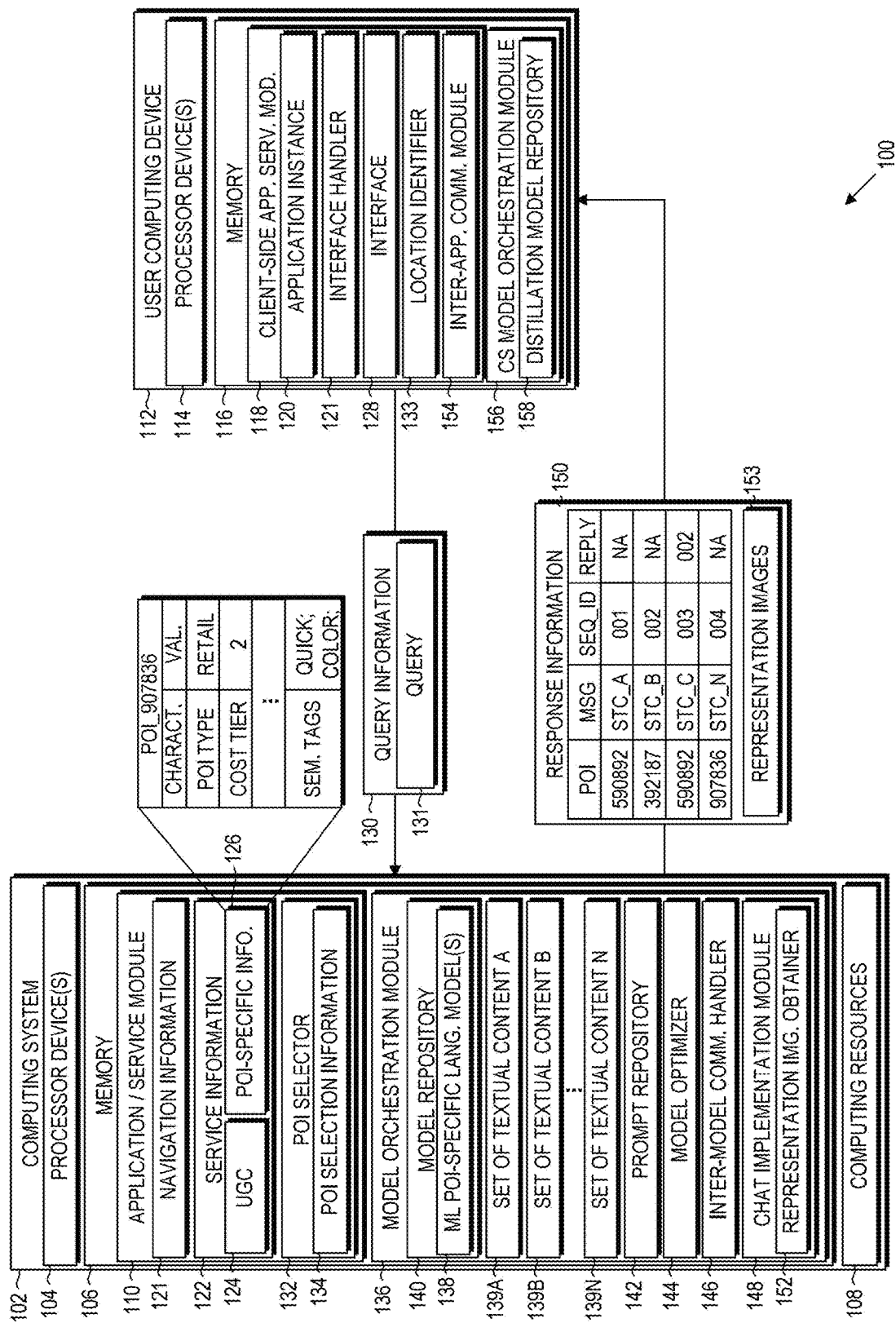
FIG. 1 is a block diagram of an environment in which machine-learned foundational models for emulating conversational interactions between points of interest (POIs) can be implemented according to some implementations of the present disclosure.

Reference numerals that are repeated across plural figures are intended to identify the same features in various implementations.

DETAILED DESCRIPTION

Overview

Generally, the present disclosure is directed to providing information via emulated conversations. More particularly, the present disclosure relates to machine-learned models, such as Large Language Models (LLMs), trained to emulate conversations from the perspectives of various Points of Interest (POIs). Specifically, conventional navigation services include routing features to route a user from a starting location to a desired Point of Interest (POI). In some instances, navigation services will also offer "profiles" for POIs that include information related to the particular POI (e.g., user-generated content (e.g., reviews, images, video, etc.), store hours, location, average wait times, etc.).

Users can submit queries for certain POI characteristics (e.g., "Food," "restaurants," "parks," etc.). In response, navigation services can search for and retrieve POI profiles for POIs with those characteristics. When searching for POIs with certain characteristics, conventional navigation applications are generally capable of filtering POIs based on characteristics that are semantically simple. For example, when searching for a restaurant, conventional navigation applications enable a user to search based on cuisine, price point, location.

However, conventional navigation services are generally incapable of searching or filtering for more semantically complex characteristics, such as the "vibe" of the interior of a restaurant, whether dogs are too loud at a dog park, etc. Instead, users must navigate to the profile for a POI within an application associated with the navigation service (e.g., a navigation application, a visual search application, etc.) to access UGC and other information included in the profile for the POI. Based on the profile, the user can determine whether the POI has those characteristics. For example, if a user wishes to determine whether a specific dish at a restaurant is spicy, the user would have to browse through a large number of user-submitted reviews to find reviews that mention the spice in that particular dish (which may not exist).

Accordingly, implementations described herein propose machine-learned models (e.g., Large Language Models (LLMs), etc.) trained to emulate conversations from the perspectives of various Points of Interest POIs. More specifically, machine-learned generative text models can be trained to converse with users from the perspective of particular POIs. If a user submits a query related to local POIs (e.g. local restaurants), the query can be provided to the machine-learned models and the machine-learned models can generate responses to the query. The responses can be provided to the user in a chat interface to emulate a conversation between the user and the POIs (e.g., as represented by the models). For example, assume that the user submits a query to a virtual assistant application such as "where can I get fast takeout?". A restaurant located within a certain distance of the user can be identified, and a machine-learned model can be instantiated to represent the restaurant. The model can process the query to generate a response based on the POI-specific information (e.g., user-generated content, etc.). For example, if user-submitted reviews frequently comment on the preparation time for takeout being five minutes, the model may generate a response such as "we can have takeout ready in as soon as 5 minutes." The response to the user can be provided to the user within a chat interface to emulate a "conversation" between the restaurant and the user.

In such fashion, implementations described herein can efficiently convey information to users to drive discoverability of POIs. Additionally, implementations described herein can enable a user to provide a request for a semantically complex characteristic to multiple POI-specific model instances associated with the multiple POIs. The POI-specific model instances can conversationally identify similarities and differences between each other with regards to the requested characteristic. By enabling POI-specific LLMs to converse, the user can effectively evaluate a large number of POIs in the time it would take to evaluate a single POI using conventional techniques (e.g., browsing a profile for each POI separately, etc.). In this manner, the implementations described herein can effectively "parallelize" POI discoverability.

Further, in many instances, the conversational framework described herein naturally enables, or causes, the POI-specific model instances to provide contextual or supplemental information that can assist the user in selecting a POI. For example, assume that a user wishes to discover a new restaurant for a date night with their partner. If their partner likes dessert, the user may query "where can I get a great dessert around me?". In response, a first POI-specific model instance for a first POI may state that the first POI offers a great tiramisu, while a second POI-specific model instance may state that the second POI has the best ice cream in the city. If the user knows their partner strongly prefers ice cream to tiramisu, the user can make a more effective POI selection decision based on the contextual information (e.g., expertise in tiramisu versus ice cream) provided by the POI-specific model instances.

Aspects of the present disclosure provide a number of technical effects and benefits. As one example technical effect and benefit, implementations described herein can substantially reduce computing resource utilization for mobile devices. More specifically, users searching for new POIs to visit are limited to evaluating one POI at a time via their mobile devices when utilizing conventional techniques, such as POI profiles for navigation services. Due to this limitation, users must utilize their mobile devices to evaluate POIs sequentially, which can require the user to interact with their mobile device for long periods of time and thus utilize substantial quantities of computing resources (e.g., compute cycles, memory, power, storage, wireless bandwidth, etc.). However, implementations described herein can enable a user to evaluate large numbers of POIs in a fraction of the time via a conversational chat interface populated by models representing various POIs, thus reducing computational resource utilization at the mobile device. In such fashion, implementations described herein can substantially reduce computing resource utilization for mobile devices.

With reference now to the Figures, example embodiments of the present disclosure will be discussed in further detail.

Example Devices and Systems

FIG. 1 is a block diagram of an environment 100 in which machine-learned foundational models for emulating conversational interactions between points of interest (POIs) can be implemented according to some implementations of the present disclosure. Specifically, in some implementations, a computing environment 100 includes a computing system 102. The computing system 102 can be a system for performing, implementing, facilitating, etc. various applications and services for navigation, visual search, virtual assistants, etc. The computing system 102 can include processor device(s) 104 and memory 106. In some implementations, the computing system 102 may be a computing system that includes multiple computing devices. Alternatively, in some implementations, the computing system 102 may be one or more computing devices within the computing environment 100 that includes multiple distributed devices and/or systems. Similarly, the processor device(s) 104 may include any computing or electronic device capable of executing software instructions to implement the functionality described herein.

The memory 106 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 106 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In some implementations, the computing system 102 can include computing resources 108. Additionally, or alternatively, in some implementations, the workload management computing system 12 can access the computing resources 108 from some other location within the computing environment 10. As described herein, the computing resources 18 can generally refer to any type, manner, or collection of physical and/or virtualized devices, software, instructions, modules, etc. The computing resources 108 can include processing devices (e.g., Central Processing Units (CPUs), Graphics Processing Units (GPUs), Application-specific Integrated Circuits (ASICs), Field-Programmable Gate Arrays (FPGAs), virtualized processing device(s), accelerator devices, qubits, etc.), network resources (e.g., bandwidth, etc.), storage devices or systems, (e.g., memory, hard disks, databases, etc.), software resources (e.g., machine-learned model instances, application instances, etc.), etc.

The memory 106 can include an application/service module 110. The application/service module 110 can implement, facilitate, coordinate, etc. the application(s) and/or service(s) described previously. For example, the application/service module 110 may implement a navigation service that is utilized by users via a corresponding navigation application. For another example, the application/service module 110 may implement a variety of services (e.g., navigation, visual search, virtual assistant, etc.) via a multi-service application (i.e., a "super" application, an "all-in-one" application, etc.).

The present disclosure, and the application/service module 110 in particular, primarily focus on navigation-related applications and/or services to more clearly illustrate the various implementations described herein. However, it should be noted that the application(s) and/or service(s) are not limited to navigation or navigation-related use-cases. Rather, the implementations described herein are applicable to any contexts in which a user wishes to evaluate a certain POI, place of business, commercial or governmental entity, etc.

The computing environment 100 can include a user computing device 112. The application(s) and/or service(s) associated with the application/service module 110 can be accessed by users via devices such as the user computing device 112. The user computing device 112 can include processor device(s) 114 and memory 116 as described with regards to the processor device(s) 104 and the memory 106 of the computing system 102. The memory 116 can include a client-side application/service module 118. The client-side application/service module 118 can instantiate, implement, execute, etc. application(s) to interact with service(s) associated with the computing system 102. Specifically, the client-side application/service module 118 can instantiate an application instance 120. The application instance 120 can be an application that enables a user of the user computing device 112 to utilize the application implemented via the application/service module 110.

For example, assume that a user of the user computing device 112 wishes to utilize a navigation service implemented by the application/service module 110. The client-side application/service module 118 can instantiate the application instance 120. The application instance 120 can be an instance of a navigation application that enables the user to interact with the navigation service. The client-side application/service module 118 can display an interface for the application instance 120 using an interface handler 121. The user can interact with the application instance 120 using the interface. Interactions between the user, the application instance 120, and/or the service implemented by the application/service module 110 will be discussed in greater detail in a subsequent section of the description.

Returning to the computing system 102, The application/service module 110 can include navigation information 119. The navigation information 119 can include mapping information, routing information, geographic information, or any other type of information utilized to provide navigation services. For example, the navigation information 119 can be, or otherwise include, a data store that includes top-down map views of particular geographic regions. For another example, the navigation information 119 can identify POIs within particular geographic regions. For example, for a particular city, the navigation information 119 can include a name and coordinates for multiple types of POIs (e.g., restaurants, businesses, public infrastructure, etc.) within the city.

As described herein, a POI generally refers to any type or manner of physical location, area, or entity that can be accessed by users, such as buildings, businesses, public infrastructure, private infrastructure, etc. Additionally, a POI can refer to locations or areas with any degree of granularity. For example, given an amusement park, the following may all qualify as distinct POIs: a particular roller coaster in the park, a particular area of the park that includes the roller coaster, the amusement park itself, the geographic area in which the amusement park is located (e.g., a city block, city, county, state, country, continent, etc.). In some implementations, a POI may refer to a virtual, non-physical area or location within a virtualized space. For example, a POI may refer to a virtualized representation of a corresponding real-life location (e.g., a photorealistic virtual representation of a park that physically exists). For another example, a POI may refer to a virtualized representation of a fictional location or historical location that previously existed.

In some implementations, a POI may refer to a service separate from the service implemented by the application/service module 110. For example, assume that the application/service module 110 implements a navigation service. A POI may refer to a particular restaurant. Alternatively, a POI may refer to a separate service, such as a food delivery service or rideshare service, that can facilitate transport of the user to the POI, or transport of goods/services from the POI to the user. Implementation of service POIs will be discussed in greater detail further on in the description.

The application/service module 110 can include service information 122. The service information 122 can include information obtained via (or for) the service and/or application of the application/service module 110. In particular, the service information 122 can include User-Generated Content (UGC) submitted by users via interactions with the application/service module 110. For example, a user of the user computing device 112 can visit a particular restaurant and capture an image of the food they are served. The user can upload the image using the application instance 120. The application/service module 110 can receive the image and store the image to the service information 122 with an association between the image and the restaurant. In such fashion, the service information 122 can serve as a repository for information and/or user-generated content specific to particular POIs.

Specifically, the service information 122 can include both UGC 124 and POI-specific information 126. The UGC 124 can include any type or manner of user-generated content, such as images, video, audio, textual content (e.g., reviews, etc.) etc. The POI-specific information 126 can include any type or manner of information related to the POI, such as location information (e.g., a precise location or dimensions of a particular POI, etc.), historical information (e.g., a number of times a user has visited a POI, a number of users to visit a POI, etc.), operational information (e.g., hours of operation, accessibility option availability, pricing information, contact information, product directories, etc.), etc. In some implementations, the POI-specific information 126 can be submitted by the POI, or a representative of the POI. For example, the POI-specific information 126 may be provided by the POI via an Application Programming Interface (API) or the like implemented by the application/service module 110 (e.g., without utilization of a corresponding application instance). Additionally, or alternatively, in some implementations, the POI-specific information 126 can be submitted by users (e.g., via an application instance).

To follow the depicted example, the POI-specific information 126 can include information specific to a particular POI identified by the identifier POI_907836 (e.g., a retail business). The POI-specific information 126 for the POI_907836 can include values for particular POI characteristics. For example, the POI-specific information 126 can include a particular POI type for the POI (e.g., retail). For another example, the POI-specific information 126 can indicate a "cost tier" for the POI which provides a sense of costs for products or services offered by the POI relative to similar offerings from POIs of the same type. For yet another example, the POI-specific information 126 can indicate semantic tags associated with the POI. Such tags can be extracted from the UGC 124 (e.g., processing user-submitted reviews with a Large Language Model (LLM), processing user-submitted images with a computer vision model to obtain a semantic output, etc.). For example, based on the semantic tags "quick" and "colorful" for the POI_907836, it can be inferred that reviews for the POI submitted by users generally describe the POI_907836 as quick and colorful, and/or that images or video of the POI submitted by users depict a clean and colorful environment.

Returning to the user computing device 112, the client-side application-service module can include the interface handler 121. The interface handler 121 can generate and display an interface 128 for the user computing device 112. For example, the interface handler 121 may display an operating system interface that enables the user of the user computing device 112 to interact with various features or services implemented by the user computing device 112. For another example, the interface handler 121 can generate an interface for the application instance 120 that enables the user to directly interact with the application instance 120, and thus, the service implemented by the application/service module 110 that communicates with the application instance 120).

The client-side application/service module 118 can send query information 130 to the application/service module 110. The query information 130 can include or otherwise describe a query 131 from the user. The query 131 from the user can be a query for certain type(s) of POIs, or for information related to certain POIs or types of POIs. For example, the user may provide a query for POIs that match certain criteria, such as expensive restaurants within walking distance, local parks open at night, local attractions that are suitable for young children, etc. For another example, the user may provide a query for POI-related information, such as holiday hours for the user's local gym, whether the head chef has changed at their favorite restaurant, etc.

In some implementations, the user of the user computing device 112 can submit the query 131 via the interface 128. For example, the user may submit the query 131 via a textual input device associated with the user computing device 112 (e.g., via a touchscreen device, keyboard device, etc.). Alternatively, in some implementations, the user may submit the query 131 via some other input device. For example, the user may submit the query 131 via a spoken utterance captured using an audio capture device. For another example, the user may submit a visual query via an image capture device. For another example, the user may submit a query by signaling intent via gesture or a multimodal combination of signals (e.g., gesture, spoken utterance, eye movement, predictive analysis, historical user behavior, etc.).

Alternatively, in some implementations, the application instance 120, or the client-side application/service module 118, can infer a query intent from the user and can generate the query 131 without explicit indication from the user. More specifically, in some instances, the client-side application/service module 118 can proactively generate the query information 130 without receiving a direct query from the user. For example, assume that the user requests directions to a hotel in a nearby major city. The client-side application/service module 118 can predict that the user will likely desire to eat at a restaurant located within a certain distance of the hotel. The client-side application/service module 118 can provide the query information 130 indicating a query for restaurants local to the user's hotel.

Additionally, in some implementations, the query information 130 can include contextual information alongside the query 131. In some implementations, the contextual information can include location information. For example, the client-side application/service module 118 can include a location identifier 133. The location identifier 133 can identify a current location of the user computing device 112 and/or a predicted future location of the user computing device 112 (e.g., based on requested navigation instructions, etc.). Additionally, or alternatively, in some implementations, the contextual information can include user-specific information, such as user preferences (e.g., meal preferences, dietary restrictions, accessibility necessities, etc.), user behavior (e.g., preferred types of POIs, preferred travel distances, etc.). The user-specific information can be gathered, stored, or implemented in a privacy-preserving manner that does not identify the user.

The query information 130 can be obtained by the application/service module 110. The application/service module 110 can include a POI selector 132. The POI selector 132 can identify and select POIs based on the query information 130. In some implementations, the POI selector 132 can select POIs based on the distance between the user's current location and the location of the POI. Additionally, or alternatively, in some implementations, the POI selector 132 can select POIs based on other criteria, such as a relevance between the query 131 and the POI, POI characteristics (e.g., POI type, POI age, POI size, etc.), transportation characteristics (e.g., whether the POI is accessible using public transportation, etc.), etc.

For example, assume that the query information 130 includes a query for restaurants within walking distance of the user. The query information 130 can indicate a current location of the user. The POI selector 132 can first determine a maximum distance to represent a "walking distance" for the user (e.g., based on user historical information (e.g., an average distance walked by the user), user preferences (e.g., whether the user requires accessibility options, whether the user wishes to utilize public infrastructure, etc.). It should be noted that, in some implementations, a distance between a POI and the user can refer to a "travel distance" that the user is predicted to travel rather than an objective distance.

Once a maximum distance is determined, the POI selector 132 can select POIs within that distance that match the characteristics requested by the user in the query information 130. To follow the previous example, the POI selector 132 can select POIs that are of the "restaurant" POI type based on the user's request for restaurants. Additionally, in some implementations, the POI selector 132 can filter some POIs from the selected POIs based on the service information 122, and/or information included in the query information 130. For example, if the service information 122 indicates that the user has a severe shellfish allergy, the POI selector 132 can filter restaurants that primarily serve shellfish from the selected POIs. For another example, if the service information 122 indicates that the user dislikes low-light environments, the POI selector can filter restaurants with low-light dining environments from the selected POIs.

Additionally, or alternatively, in some implementations, the POI selector 132 can rank selected POIs based on the same information. To follow the previous example, assume that a restaurant serves shellfish but does not focus primarily on shellfish-based meals. Rather than excluding the POI, the POI selector 132 may decrease the rank of the POI relative to other selected POIs. For another example, assume that user-submitted reviews for the same restaurant indicate that service at the restaurant is very fast. If the user prefers fast service, the POI selector 132 may increase the ranking of the restaurant. In this manner, the POI selector 132 can select an optimal set of POIs for the user based on contextual information and user preferences.

The POI selector 132 can generate POI selection information 134. The POI selection information 134 can indicate a set of POIs, which can include some (or all) of the selected by the POI selector 132. For example, assume that the application/service module 110 specifies a maximum quantity of POIs to be selected. If the POI selector 132 initially selects a number of POIs greater than the maximum quantity, the POI selector 132 can rank the selected POIs and remove the lowest ranked POIs until the maximum quantity is reached. In some implementations, the POI selection information 134 can include contextual information. The contextual information can include information extracted from the POI-specific information 126, some (or all) of the UGC 124, some (or all) of the query information 130, etc.

The application/service module 110 can include a model orchestration module 136. The model orchestration module 136 can perform various actions to orchestrate machine-learned models, including model instantiation, training, inference, storage, updating, fine-tuning, etc. In particular, the model orchestration module 136 can orchestrate machine-learned POI-specific language model(s) 138. As described herein, the machine-learned POI-specific language model(s) 138 can be machine-learned model(s) (or instance(s) thereof) that has been configured (e.g., via prompting, training, fine-tuning, etc.) to generate sets of textual content 139A-139N (generally, sets of textual content 139) from the perspective of particular POI(s).

For example, assume that one of the POIs indicated by the POI selection information 134 is a restaurant called "Steve's Hamburgers." The machine-learned POI-specific language model(s) 138 can include a model trained or prompted to generate textual content from the perspective of "Steve's Hamburgers," or a representative thereof. If the query information 130 includes a query "where can I get a vegetarian-friendly hamburger?", the model may generate a set of textual content such as "Here at Steve's, we make all kinds of vegetarian-friendly hamburgers, like tuna burgers and black bean burgers!"

In some implementations, the machine-learned POI-specific language model(s) 138 can be instances of the same model that are prompted to respond from the perspective of a specific POI. To follow the previous example, the model orchestration module 136 may instantiate a first LLM instance, and process the query information 130 with the first LLM instance alongside a first prompt that prompts the model to "act like a representative of Steve's Burgers." The model orchestration module 136 may instantiate a second LLM instance, and process the query information 130 with the second LLM instance alongside a second prompt that prompts the model to act like a representative of some other corresponding POI. Alternatively, in some implementations, the model orchestration module 136 may provide the query information 130 and the second prompt to the first LLM instance to reduce the total quantity of model instances loaded into memory.

Additionally, or alternatively, in some implementations, the machine-learned POI-specific language model(s) 138 can include instances of different models. To follow the previous example, assume that the first POI (e.g., for "Steve's Burgers") is a fast-food restaurant and the second POI is an upscale sit-down restaurant. The first LLM instance can be an instance of an LLM trained or fine-tuned to generate textual content from the perspective of fast-food restaurants, while the second LLM instance can be an instance of an LLM trained or fine-tuned to generate textual content from the perspective of upscale sit-down restaurants. In some implementations, the model orchestration module 136 can prompt models that are configured for particular types of POIs. To follow the previous example, the LLM instance trained to generate textual content from the perspective of fast-food restaurants can be prompted to specifically generate textual content from the perspective of "Steve's Burgers." As such, model(s) (and/or corresponding model instance(s) can be optimized and/or prompted to emulate the perspective of particular POIs, particular POI types, etc.

In some implementations, the machine-learned POI-specific language model(s) 138 can include model(s) or model portion(s) that are trained to process non-textual content, such as image data, video data, audio data, etc. For example, assume that the query information 130 includes a query image and corresponding textual content. The machine-learned POI-specific language model(s) 138 can include a multimodal model that generates a multimodal intermediate representation (e.g., a tokenized representation, etc.) of the query image and the corresponding textual content. Similarly, the machine-learned POI-specific language model(s) 138 can also include generative model(s) or model portion(s) trained to generate content other than textual content, such as images, video, speech, application-specific data (e.g., mapping data, routing data, etc.). To follow the previous example, in addition to the textual content, the LLM instance representing "Steve's Burgers" may also generate a representative image of a "tuna burger" or "black bean burger," or may select an existing representative image of those items (e.g., from the UGC 124, etc.).

The model orchestration module 136 can select, instantiate, or otherwise implement the machine-learned POI-specific language model(s) 138 in response to the POI selection information 134. For example, if the POI selection information 134 indicates five different POIs, the model orchestration module 136 may instantiate five instances of the machine-learned POI-specific language model(s) 138. Alternatively, the model orchestration module 136 may instantiate fewer than five instances. For example, if three of the POIs are of a first POI type (e.g., fast food restaurants) and two of the POIs are of another POI type (e.g., convenience stores), the model orchestration module 136 may instantiate two of the machine-learned POI-specific language model(s) 138: one trained to generate textual content from the perspective of POIs of the first POI type and another trained to generate textual content from the perspective of POIs of the second POI type.

The model orchestration module 136 can include a model repository 140. The model repository 140 can store the machine-learned POI-specific language model(s) 138. Additionally, in some implementations, the model repository 140 can store contextual information associated with the various machine-learned POI-specific language model(s) 138, such as versioning information, training datasets, etc. Additionally, in some implementations, the model orchestration module 136 can include a prompt repository 142 to store prompts to prompt the machine-learned POI-specific language model(s) 138 to generate textual content from certain perspective(s) as needed. The model orchestration module 136 can include a model optimizer 144. The model optimizer 144 can train, fine-tune, prompt, or otherwise optimize the machine-learned POI-specific language model(s) 138 to generate content from the perspective of certain POIs.

Specifically, in some implementations, the model repository 140 can include a single large language model. The model repository 140 can instantiate multiple instances of the LLM and can zero- or few-shot prompt the instances with the data associated with the POIs (e.g., description, images, comments, videos, etc.). The POI also may have specific metadata pulled from other sources (e.g. public information repositories) that can be provided as contextual information to the LLM instances. Additionally, or alternatively, in some implementations, the model repository can include a single LLM with but with specific fine-tuned weights that can be combined per POI. Additionally, or alternatively, in some implementations, the model repository 140 can include multiple LLMs that can alternatively be fine-tuned per type of POI. For example, the model repository 140 can include an LLM trained to generally represent restaurants. If multiple restaurants are selected, that particular LLM can be instantiated and prompted with multiple prompts that respectively correspond to the multiple restaurants. The model repository 140 can include additional LLM(s) for other types of POIs (e.g., parks, services, etc.).

The model orchestration module 136 can include an inter-model communication handler 146. The inter-model communication handler 146 can facilitate communication between the machine-learned POI-specific language model(s) 138 (or instances thereof). In particular, the inter-model communication handler 146 can select one of the sets of textual content 139 generated using one of the machine-learned POI-specific language model(s) 138 and use the selected textual content as an input to another of the machine-learned POI-specific language model(s) 138 in a conversational manner (e.g., prompting the second model to respond to the first model). For example, assume that the set of textual content 139A asserts some particular fact about a POI. The inter-model communication handler 146 can process the query information 130 and the set of textual content 139A with another of the machine-learned POI-specific language model(s) to generate the set of textual content 139B. The set of textual content 139B can include a response to the set of textual content 139A that addresses the fact about the POI.

For example, assume that the query information 130 is indicative of a query for the best pecan pie in a local area. One of the machine-learned POI-specific language model(s) 138 can process the query information 130 to generate the set of textual content 139A from the perspective of the first POI (e.g., "our customers here at John's pie emporium claim that we have the best pecan pie in the state"). Another of the machine-learned POI-specific language model(s) 138 can generate the second set of textual content 139B that responds to the textual content generated by the first model (e.g., "the customers at Ryan's pie shop say the same, but Ryan's Pie shop came in first place at the 2023 Pecan Pie contest!").

The application/service module 110 can include a chat implementation module 148. The chat implementation module 148 can facilitate provision of model outputs (e.g., the sets of textual content 139) from the machine-learned POI-specific language model(s) 138 to the user computing device within a chat interface. Specifically, the application/service module 110 can generate response information 150. The response information 150 can include the sets of textual content 139 generated using the machine-learned POI-specific language model(s) 138 in response to the query information 130. The chat implementation module 148 can generate the response information 150 such that the sets of textual content 139 are formatted for display within a chat interface at the user computing device 112.

The chat implementation module 148 can include a representation image obtainer 152. The representation image obtainer 152 can obtain representation images 153 to represent particular POIs within the interface 128. More specifically, conventional chat applications generally represent messages from people via dialogue boxes originating from a representative "avatar" that represents a particular message source. Examples of avatars commonly used in messaging applications include logos, photographs, "default" representations (e.g., circles that include the first letter of a user's first name), etc. The representation image obtainer 152 can obtain the representation images 153 to represent particular POIs within the chat interface of the interface 128. For example, the representation image obtainer 152 may generate one of the representation images 153 using a generative visual model. For another example, the representation image obtainer 152 may select one of the representation images 153 from the UGC 124 or the POI-specific information 126. For yet another example, the representation image obtainer 152 may generate instructions for the user computing device 112 to utilize an image stored locally to the user computing device 112 as one of the representation images 153. The chat implementation module 148 can include the representation images 153 in the response information 150.

The chat implementation module 148 can format the response information 150 for display within the chat interface 128. The response information 150 can associate sets of textual content, or "messages," with the machine-learned POI-specific language model(s) 138 used to generate those sets of textual content. The response information 150 can also include sequence identifiers for the sets of textual content to indicate an order in which the sets should be displayed within the chat interface. In some implementations, the response information 150 can indicate whether a set of textual content is a reply to a previous set so that the reply can be displayed in a manner that suggests the set of textual content is a reply (e.g., by providing a visual association between the reply and the prior set of textual content).

More specifically, returning to the user computing device 112, the client-side application/service module 118 can display the interface 128 via the interface handler 121. Once the user provides the query 131 (e.g., to be described by the query information 130), the query 131 can be displayed as a message within the interface 128. For example, assume that the application instance 120 is a navigation application, and the interface 128 is an interface implemented by (or for) the navigation application. The user can submit the query via the navigation application (e.g., into a search element of the navigation application displayed within the interface 128). Once submitted, the interface 128 can change to a "chat" interface typical of messaging text-message-based applications in which messages are depicted as "dialogue" emanating from a visual representation of the user (e.g., a circle that includes the first letter of the user's first name, a profile picture commonly used by the user, etc.). The query 131 can be depicted as a "dialogue" message emanating from (i.e., sent by) the user.

The client-side application/service module 118 of the user computing device 112 can include an inter-application communication module 154. The inter-application communication module 154 can facilitate communications between the application instance 120 and other application instances executed by the user computing device 602. Additionally, or alternatively, in some implementations, the inter-application communication module 154 can communicate with external services implemented by the computing system 102 or other computing systems. For example, assume that the user of the user computing device 112 selects a particular restaurant from the selected POIs. Based on additional inputs from the user, the inter-application communication module 154 may interface with a food delivery application or service to deliver food from that restaurant to the user. Additionally, or alternatively, the inter-application communication module 154 may select a web browser or document reading application to enable the user to view the menu for the restaurant. Additionally, or alternatively, the inter-application communication module 154 may select an Augmented Reality (AR)/Virtual Reality (VR) application or operating system feature to explore a representation of the POI in an AR/VR environment.

Figure 2:
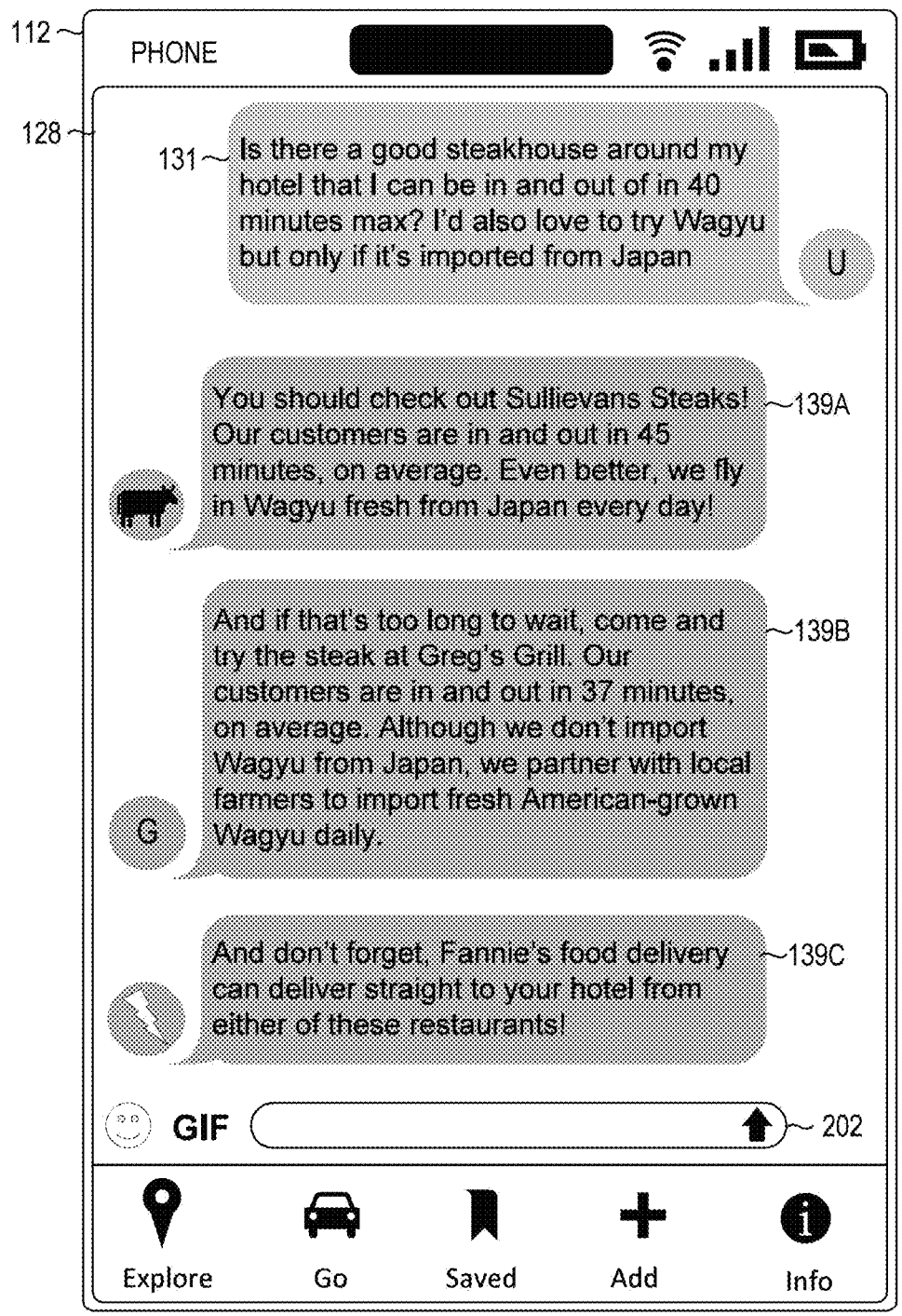
FIG. 2 illustrates an example user computing device displaying an interface for the application instance populated with the sets of textual content to emulate a conversation between multiple POIs according to some implementations of the present disclosure.

Turning to FIG. 2, FIG. 2 illustrates an example user computing device displaying an interface 128 for the application instance 120 populated with the sets of textual content 139 to emulate a conversation between multiple POIs according to some implementations of the present disclosure. FIG. 2 will be discussed in conjunction with FIG. 1. Specifically, to follow the depicted example, the user computing device 112 can be a smartphone device utilized by a user. The user can provide the query 131 (e.g., via a text input field 202, etc.). Upon receipt of the query, the interface 128 can be displayed as a chat interface, and the query 131 can be displayed as a message emanating from a representation image that represents the user. To follow the depicted example, the representation image for the user can be a "placeholder image" that depicts a circle with the first letter of the user's name.

The query information 130 including the query 131 can be sent to the computing system 102. In response, the user computing device 112 can receive the response information 150. The response information 150 can include the sets of textual content 139 and the representation images 153. The response information can format the sets of textual content 139 so they can be inserted into the chat interface 128. Similar to the query 131, the sets of textual content 139 can be depicted as "dialogue" emanating from the representation images 153 that represent the corresponding POIs.

To follow the depicted example, the POI selector 132 can select three POIs in response to the query information 130 (e.g., Sullievan's Steaks, Greg's Grill, Fannie's food delivery). The sets of textual content 139 are depicted as messages, or "dialogue," that originates from the representation images 153 that represent the POIs. Specifically, one of the machine-learned POI-specific language model(s) 138 can be trained to generate textual content from the perspective of the first POI (e.g., Sullievan's Steaks). That machine-learned POI-specific language model 138 can generate the first set of textual content 139A as a response to the query 131 from the perspective of the first POI (e.g., Sullievan's steaks). Another of the machine-learned POI-specific language model(s) 138 can be trained to generate textual content from the perspective of the second POI (e.g., Greg's Grill). That model can generate the second set of textual content 139B as a response to the query 131 (and, optionally, as a response to the first set of textual content 139A) from the perspective of the second POI. Yet another of the machine-learned POI-specific language model(s) 138 can be trained to generate textual content from the perspective of the third POI (e.g., Fannie's food delivery). That model can generate the second set of textual content 139C as a response to the query 131 and the sets of textual content 139A and 139B from the perspective of the third POI. In such fashion, implementations described herein can enable a user to efficiently and effectively evaluate multiple POIs within a chat-based interface.

Returning to FIG. 1, the client-side application/service module 118 of the user computing device 112 can, in some implementations, include a client-side model orchestration module 156. In some implementations, the client-side model orchestration module 156 can orchestrate local machine-learned model inference to perform some (or all) of the operations described with regards to the model orchestration module 136. The client-side model orchestration module 156 can store a distillation model repository 158 that includes models that are generally "smaller" than the machine-learned POI-specific language model(s) 138, or otherwise require fewer computing resources for inference. These models can be trained via distillation from the machine-learned POI-specific language model(s) 138.

Figure 3:
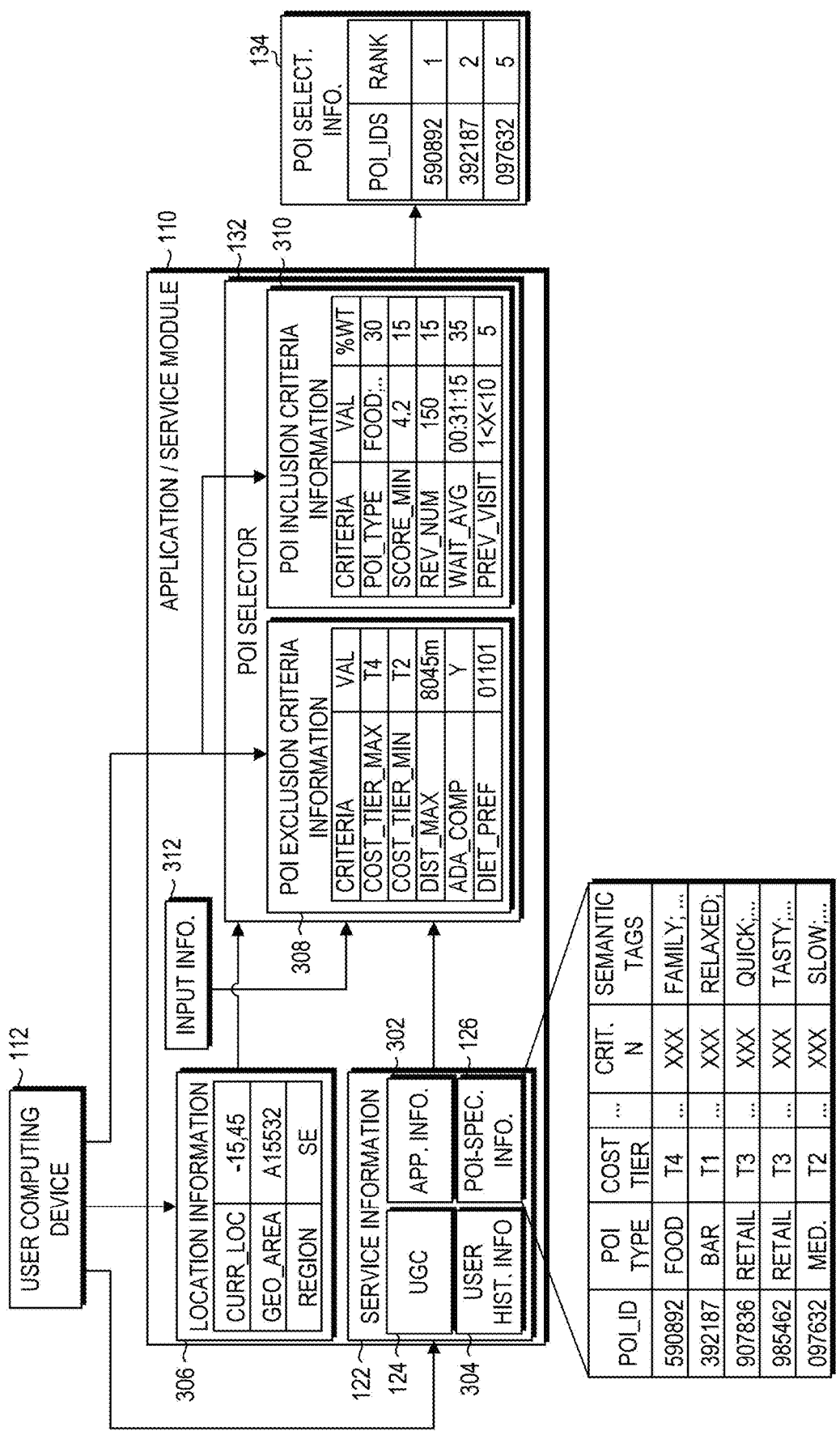
FIG. 3 is a block diagram of the application/service module of the computing system of FIG. 1 according to some implementations of the present disclosure.

FIG. 3 is a block diagram of the application/service module 110 of the computing system 102 of FIG. 1 according to some implementations of the present disclosure. FIG. 3 will be discussed in conjunction with FIG. 1. Specifically, the application/service module 110 can include the service information 122. The service information can include UGC 124 and POI-specific information 126. The POI-specific information 126 can describe various characteristics for POIs, such as POI type, cost tier, etc. For example, a POI type can refer to general classifications of POIs (e.g., restaurants, retail stores, corporate headquarters, manufacturing locations, public parks, airports, subways, etc.). For another example, a "cost tier" can generally indicate an expected price for a good or service relative to other goods or services of that type.

In some implementations, the POI-specific information 126 can include semantic tags or labels for POIs. The semantic tags can be obtained using a variety of techniques. For example, the semantic tags may be obtained from POIs via an API implemented by the application/service module 110. For another example, the semantic tags can be generated by processing the UGC 124 for the POI with an LLM or the like. The semantic tags can be utilized to select and/or rank POIs by the POI selector 132. The semantic tags can also be utilized for prompting the machine-learned POI-specific language model(s) 138. To follow the depicted example, a model for the POI represented by POI_ID 097632 can be prompted with the semantic tag "SLOW" to indicate that the POI is not known for its slow service. In this manner, implementations described herein can enforce accurate responses from the machine-learned POI-specific language model(s) 138.

The POI-specific information 126 can include information other than the POI-specific characteristics. For example, the POI-specific information 126 can include information provided by the POIs, such as business hours, accessibility information, maps (e.g., interior maps or directors), logos, menus, etc. In some implementations, the POI-specific information 126 can include performance metrics or performance-based statistics for the POI, such as health scores, average wait times, review scores, etc. Additionally, or alternatively, in some implementations, the POI-specific information 126 can include temporal information, or information related to upcoming events. For example, assume that the POI identified by POI_ID 590892 is a brewery that is scheduled to host a local music festival in the near future. The POI can provide POI-specific information 126 to the application/service module 110 that describes the event. The POI-specific information 126 can be utilized as a contextual input to the model representing the POI until the event has occurred. Alternatively, the temporal information may be obtained in some other manner, such as analysis of social media content, etc.

The service information 122 can include application information 302. The application information 302 can include information specific to an application or service implemented by the application/service module 110. The application information 302 can include information descriptive of previous interactions with POIs, types of POIs, or representations of POIs within the application or service. For example, the application information 302 may indicate whether a certain type of user prefers a certain type of POI. For another example, the application information 302 may indicate an average number of visitors to a POI over time, or at certain times.

In some implementations, the application information 302 can include integration information utilized to integrate POIs with other websites, applications, services (e.g., third party services, other services offered by the application/service module 110, etc.), etc. Specifically, in some implementations, the application information 302 can include integration information that integrates POIs with certain services. For example, the integration information may integrate a restaurant POI with a food delivery service (e.g., enabling a user to order delivery directly from the restaurant while remaining within the application instance 120). For another example, the integration information may integrate a destination POI (e.g., a park, attraction, movie theater, etc.) with a rideshare service (e.g., enabling a user to request rideshare transportation directly to the POI while remaining within the application instance 120).

Additionally, or alternatively, in some implementations, the integration information can include web integrations to integrate with web-based services, such as social media services. For example, the integration information may include links to relevant social media accounts for particular POIs. In some implementations, if the integration information includes links to social media accounts or some other source of social media information, the application/service module 110 can extract information from those social media accounts, such as recent posts, updates, uploaded content, etc. In this manner, the application/service module 110 can prompt models with up-to-date information to ensure the recency of model outputs.

In some implementations, the service information can include user historical information 304. The user historical information 304 can describe previous interactions between the user of the user computing device 112 and POIs. For example, the user historical information 304 can include predictions for certain POI preferences, such as a preferred type of POI, preferred hours of operations, preferred travel distances, etc. In some implementations, the predictions for POI preferences can be based on an analysis of interactions between the particular user and other POIs. Additionally, or alternatively, in some implementations, the predictions for POI preferences can be based on an analysis of interactions between multiple users of the application or service and other POIs. In some implementations, the user historical information 304 can describe user preferences (e.g., meal preferences, dietary restrictions, accessibility necessities, etc.), user behavior (e.g., preferred types of POIs, preferred travel distances, etc.), etc. The user-specific information can be gathered, stored, or implemented in a privacy-preserving manner that does not identify the user.

In some implementations, the application/service module 110 can include location information 306. The location information 306 can indicate a current location of the user computing device 112. Additionally, or alternatively, in some implementations, the location information 306 can indicate a predicted location of the user computing device at a future point in time. For example, the user computing device 112 can submit a request for a route to a particular destination. The application/service module 110 can obtain the route generated for the user and use the route to predict the future location of the user computing device at the future point in time. In some implementations, the location information 306 can be generated by the application/service module 110 (e.g., as described in the preceding example). Additionally, or alternatively, in some implementations, the location information 306 can be provided by the user computing device 112.

The POI selector 132 can process the location information 306 and the service information 122 to obtain the POI selection information 134. The POI selection information 134 can indicate a set of selected POIs to represent with the machine-learned POI-specific language model(s) 138. In some implementations, to generate the POI selection information 134, the POI selector 132 can include POI exclusion criteria information 308. For example, the POI selector 132 may generate the POI exclusion criteria information 308, and/or may receive the POI exclusion criteria information 308 from the user computing device 112.

The POI exclusion criteria information 308 can indicate minimum or maximum values for certain criteria to determine whether to exclude a POI from the POI selection information 134. To follow the depicted example, the POI exclusion criteria information 308 can include a maximum cost tier (e.g., tier 4) and a minimum cost tier (e.g., tier 2). As such, a POI with a tier 1 or tier 5 cost tier may be excluded from the POI selection information 134.

Additionally, or alternatively, in some implementations, the POI exclusion criteria information 308 can include a maximum travel distance for the user to travel to the POI. In some implementations, the maximum travel distance can be determined based on an objective measure of distance between the user's current location and the POI. Alternatively, in some implementations, the maximum travel distance can be determined based on an analysis that accounts for available transportation modalities (e.g., private transportation, rideshare services, public transportation, etc.), current traffic levels, predicted traffic congestion, etc. to provide a more accurate determination of travel distance. Such a determination can be made by the POI selector 132 based on information within the service information 122. For example, the application information 302 may include information descriptive of current traffic patterns, while the user historical information 304 can indicate whether the user is willing to utilize public transportation.

Additionally, or alternatively, in some implementations, POI exclusion criteria information 308 can include accessibility criteria, such as the availability of accessibility options. Such a determination can be made by the POI selector 132 based on the service information 122. For example, a portion of the POI-specific information 126 can indicate whether the POI is compliant with accessibility regulations (e.g., a portion provided by the POI, a portion made available by government entities that routinely evaluate accessibility compliance for POIs, etc.). For another example, the UGC 124 may include images that depict accessibility features. Such accessibility features can be detected based on an analysis of the UGC images performed by the POI selector 132 (e.g., using various computer vision techniques or machine-learned models). For yet another example, the user historical information 304 can indicate whether the user has any specific accessibility requirements or preferences. Additionally, or alternatively, in some implementations, POI exclusion criteria information 308 can include dietary preference criteria.

It should be noted that failure to meet one (or more) of the exclusion criteria does not necessarily cause exclusion of a POI from the POI selection information 134. Rather, in some implementations, the exclusion criteria can be weighted, and can be utilized to rank the POIs indicated by the service information 122. For example, a POI that exceeds a maximum distance criteria is relatively likely to be viewed unfavorably by the user, and as such, exceeding the maximum distance criteria would likely be associated with a correspondingly heavy ranking penalty. Conversely, failing to meet a minimum cost tier criteria is substantially less likely to be viewed unfavorably by the user, and as such, failing to meet the minimum cost tier would likely be associated with a correspondingly light ranking penalty.

Additionally, or alternatively, in some implementations, to generate the POI selection information 134, the POI selector 132 can include POI inclusion criteria information 310. For example, the POI selector 132 may generate the POI inclusion criteria information 310, and/or may receive the POI inclusion criteria information 310 from the user computing device 112.

The POI inclusion criteria information 310 can indicate minimum or maximum values for certain criteria to determine whether to include a POI from the POI selection information 134. Specifically, in some implementations, the POI inclusion criteria information 310 can include a POI type criteria that indicates a desired type of POI, such as "food" (e.g., a POI that provides food in some manner), "CONV" (e.g., a convenience store), "REST" (e.g., a restaurant) "PARK" (e.g., a public park), etc. The POI selector 132 can determine which type(s) of POIs a user is likely to wish to search for. Such a determination can be made by the POI selector 132 based on information within the service information 122. For example, the application information 302 may include information descriptive of a desired POI type, while the user historical information 304 can indicate whether the user has historically preferred other types of POIs.

In some implementations, the POI inclusion criteria information 310 can include a minimum score criteria. The minimum score criteria can indicate a minimum aggregate score for the POI based on user-submitted reviews. The POI selector 132 can determine the minimum score that the user is likely to prefer. Such a determination can be made by the POI selector 132 based on information within the service information 122. For example, the UGC 124 can include an aggregate score for the POI from user-submitted reviews, and the user historical information 304 can indicate whether the user has historically preferred POIs with a certain minimum score.

In some implementations, the POI inclusion criteria information 310 can include a minimum number of reviews criteria. The minimum number of reviews criteria can indicate a minimum number of reviews for the POI based on user-submitted reviews. The POI selector 132 can determine the minimum number of reviews that the user is likely to prefer. Such a determination can be made by the POI selector 132 based on information within the service information 122. For example, the UGC 124 can include the number of scores submitted for the POI from user-submitted reviews, and the user historical information 304 can indicate whether the user has historically preferred POIs with a certain number of reviews.

In some implementations, the POI inclusion criteria information 310 can include a previous visit criteria. The previous visit criteria can be a preferred number of visits (or range of visits) that the user has previously made to POI. The POI selector 132 can determine the preferred number of visits. To follow the depicted example, the POI inclusion criteria information 310 indicates that the user prefers POIs that they have visited more than once but less than ten times. Such a determination can be made by the POI selector 132 based on information within the service information 122. For example, the user historical information 304 can indicate a number of times the user has visited the POI, and a preferred number of visits to POIs historically.

As described with regards to the POI exclusion criteria information 308, it should be noted that successfully meeting one (or more) of the inclusion criteria does not necessarily cause inclusion of a POI in the POI selection information 134. Rather, in some implementations, the inclusion criteria can be weighted, and can be utilized to rank the POIs indicated by the service information 122. For example, a POI that fails to meet the minimum score criteria is relatively likely to be viewed unfavorably by the user, and as such, failing to meet the minimum score criteria would likely be associated with a correspondingly heavy ranking penalty. Alternatively, in some implementations, successfully meeting one (or a certain quantity and/or type) of the inclusion criteria can automatically cause inclusion of the POI.

In some implementations, the POI selector 132 can rank POIs and then select a subset of the ranked POIs for inclusion in the POI selection information 134. To follow the depicted example, assume that the POI selector 132 ranks POI_IDs 590892, 392187, 907836, 985462, and 097632 in descending order (e.g., 1, 2, 3, 4, 5). Further assume that POI_IDs 907836 and 985462 are excluded based on the POI exclusion criteria information 308. The POI_IDs selected for inclusion can be the first, second, and fifth ranked POIs.

In some implementations, the user computing device 112 can provide input information 312 to the application/service module 110. The input information 312 can indicate some manner of input from the user that explicitly or implicitly selects a particular geographic area, type of POI, etc. The POI selector 132 can utilize the input information 312 to generate an initial selection of POIs (e.g., to be reduced to the selected POIs of the POI selection information 134), and/or to determine an area from which to initially sample POIs for subsequent selection. For example, the input information 312 may merely include a phrase or name of a particular geographic area (e.g., Zurich). For another example, the input information 312 may be indicative of a particular route requested by the user.

In some implementations, the input information 312 can be derived from the query 131. For example, if the user submits a standard query, such as "Italian restaurants in Zurich," then "Zurich" may be extracted for inclusion in the input information 312. Additionally, or alternatively, in some implementations, the input information can be derived from a route requested by the user. For example, if the user requests a route, the input information 312 may indicate the area(s) through which the user will travel while navigating the route.

Figure 4:
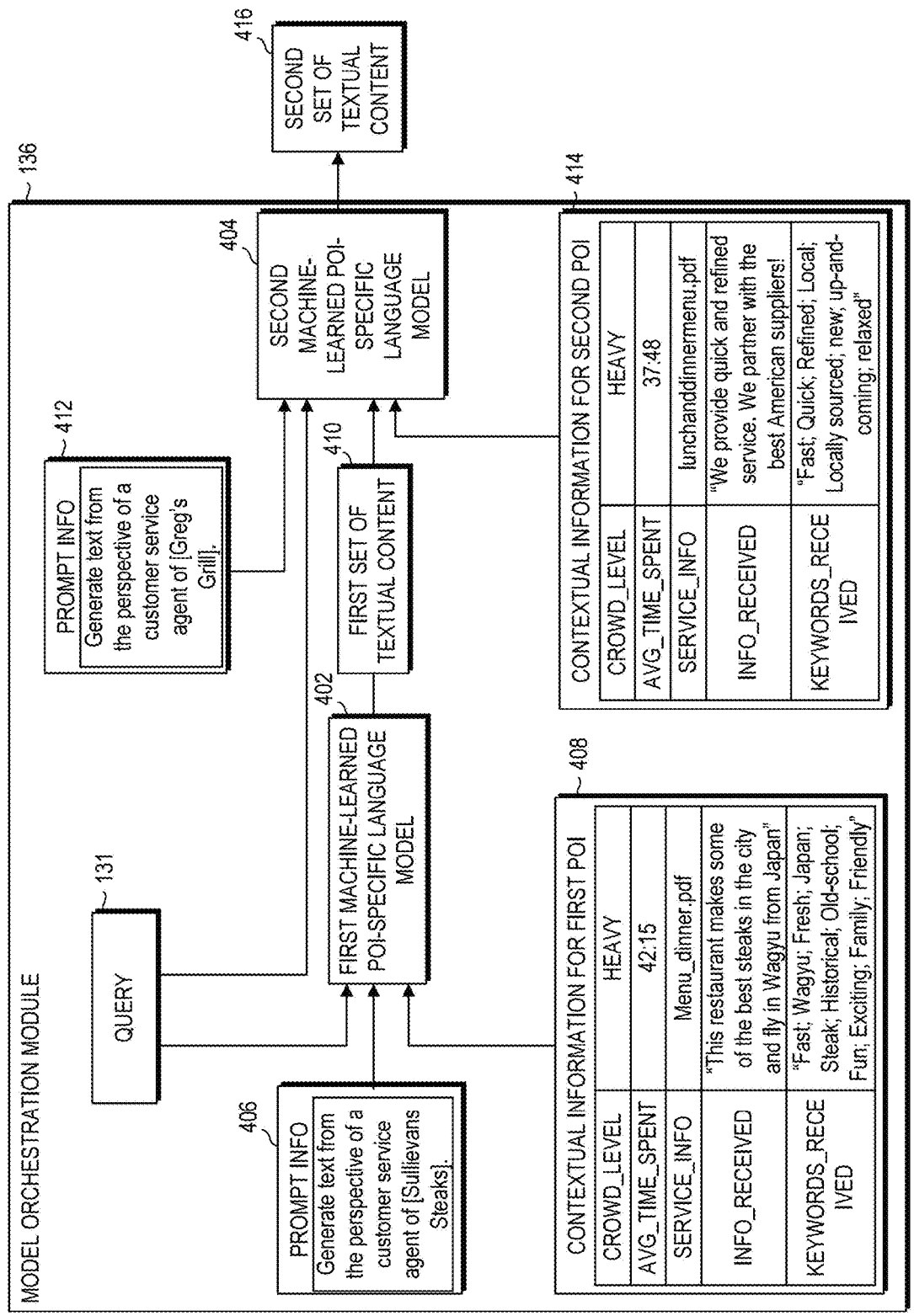
FIG. 4 is a block diagram of the model orchestration module of the computing system of FIG. 1 according to some implementations of the present disclosure.

FIG. 4 is a block diagram of the model orchestration module 136 of the computing system 102 of FIG. 1 according to some implementations of the present disclosure. FIG. 3 will be discussed in conjunction with FIGS. 1 and 3. Specifically, the model orchestration module 136 can include the query 131 described by the query information 130. The model orchestration module 136 can include a first machine-learned POI-specific language model 402 and a second machine-learned POI-specific language model 404. The second machine-learned POI-specific language models 402 and 404 can be two different models from the machine-learned POI-specific language model(s) 138, or can be two instances of the same machine-learned POI-specific language model 138.

Specifically, in some implementations, the first machine-learned POI-specific language model 402 can be a model specifically trained or fine-tuned to generate textual content from the perspective of a first POI (e.g., Sullievan's steaks). For example, the model optimizer can train the model by modifying values of parameters of the machine-learned POI-specific language model to cause the model to generate textual content from the perspective of the first POI. Additionally, or alternatively, in some implementations, the first machine-learned POI-specific language model 402 can be prompted to generate textual content from the perspective of the first POI.

For example, the model orchestration module 136 can obtain prompt information 406 (e.g., from the prompt repository 142, etc.). The prompt information 406 can include textual content descriptive of instructions to the first machine-learned POI-specific language model 402 can be prompted to generate textual content from the perspective of the first POI. In some implementations, the prompt information 412 can be generated using a language model such as an LLM. Alternatively, in some implementations, the prompt information 412 can be generated using conventional parsing techniques, such as regular expressions, etc. (e.g., replacing a placeholder name value "[POI name]" with "Sullievan's steaks").

In some implementations, the model orchestration module 136 can instantiate the first machine-learned POI-specific language model 402 and the second machine-learned POI-specific language model 404 in response to the POI selection information 134. For example, assume that the POI selection information 134 indicates selection of a first and second POI. The model orchestration module 136 may determine that pre-trained models do not exist for either POI, and in response, can instantiate two default instances of an LLM or the like. The model orchestration module 136 can then obtain the prompt information 406 to prompt the first POI-specific machine-learned language model 402. In such fashion, the model orchestration module 136 can dynamically instantiate and prompt pre-trained foundational models, such as LLMs, to generate textual content from the perspective of a particular POI without requiring the performance of additional training or fine tuning processes.

The first machine-learned POI-specific language model 402 can process the query 131 along with contextual input information 408. The contextual input information 408 can include information from the service information 122, the location information 306, etc. To follow the depicted example, the contextual input information 408 can indicate a current crowd level at the POI, an average time spent at the POI, information received from the POI, keywords received from the POI, etc. The contextual input information 408 can be processed alongside the prompt information 406 and the query 131 to obtain a first set of textual content 410. The textual content 410 can include a response to the query 131.

To provide information to the user in a conversational manner, the model orchestration module 136 can cause the second machine-learned POI-specific language model 404 to generate a response based on the query 131 and the first set of textual content 410. In some implementations, the model orchestration module 136 can obtain second prompt information 412 and second contextual input information 414 as described with regards to the prompt information 406 and the contextual input information 408.

In some implementations, the second machine-learned POI-specific language model 404 may generate a response that responds directly to the first set of textual content 410. For example, the second machine-learned POI-specific language model 404 may process the first set of textual content 410, the query 131, and the second contextual input information 414 with the second machine-learned POI-specific language model 404 to obtain a second set of textual content 416 that directly or indirectly addresses some portion of the first set of textual content 410. For example, the second set of textual content 416 may merely imply or indicate that the response is following a preceding response. Additionally, or alternatively, in some implementations, the second prompt information 412 can instruct the second machine-learned POI-specific language model 404 to acknowledge the first set of textual content 410 in a conversational manner.

Figure 5:
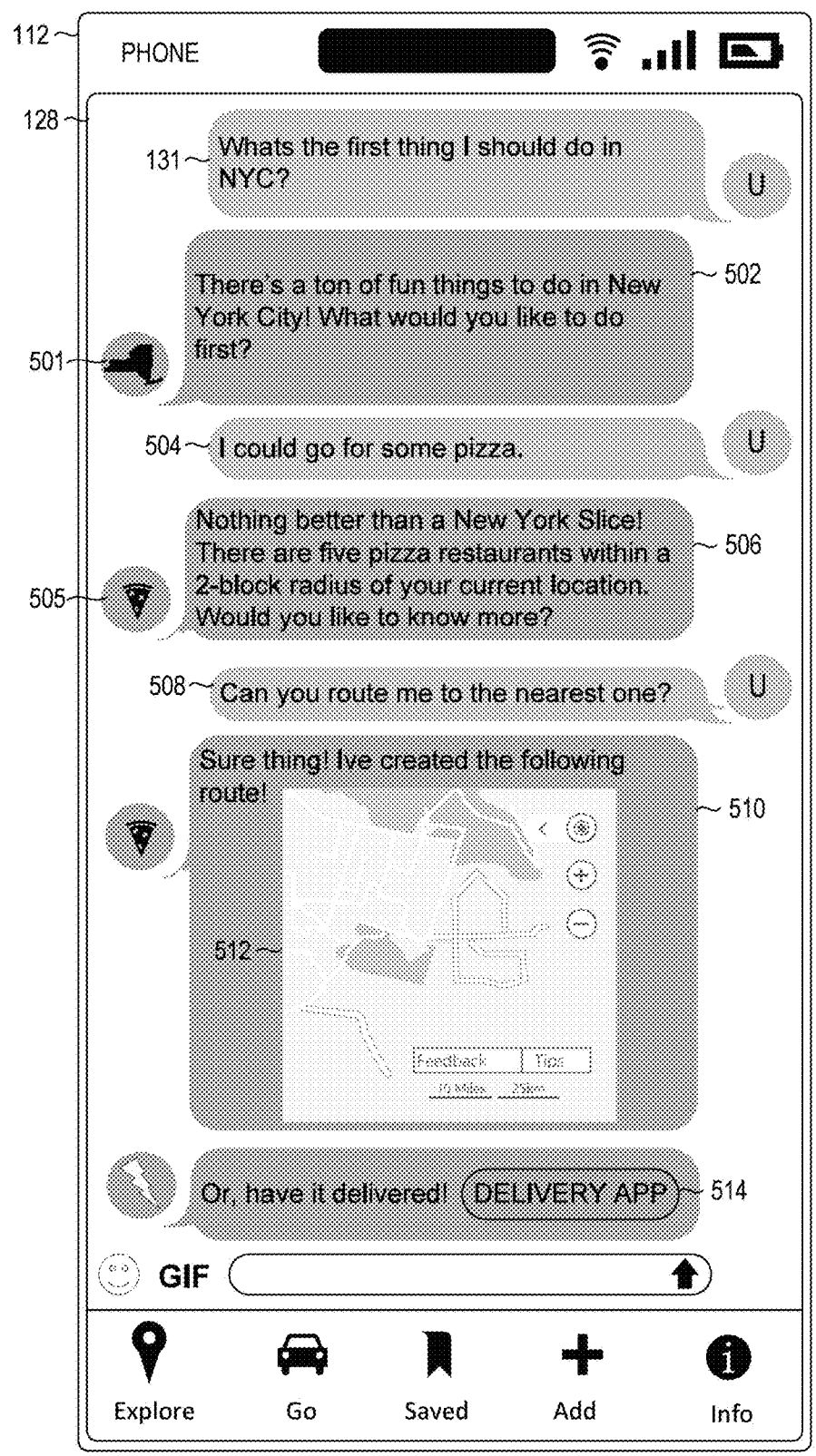
FIG. 5 illustrates an example user computing device displaying the interface for the application instance populated with the sets of textual content to emulate a conversation between POI groupings according to some implementations of the present disclosure.

FIG. 5 illustrates an example user computing device displaying the interface 128 for the application instance 120 populated with the sets of textual content 139 to emulate a conversation between POI groupings according to some implementations of the present disclosure. FIG. 5 will be discussed in conjunction with FIG. 1. Specifically, to follow the depicted example, the user computing device 112 can be a smartphone device utilized by a user. The user can provide the query 131. Upon receipt of the query, the interface 128 can be displayed as a chat interface, and the query 131 can be displayed as a message emanating from a representation image that represents the user. To follow the depicted example, the representation image for the user can be a "placeholder image" that depicts a circle with the first letter of the user's name.

Based on the breadth of the user's query, the POI selector 132 can initially select a geographic area as the POI, or in this case, New York City. More generally, the POI selector 132, in conjunction with the prompt repository 142, can select any type or manner of POI, including geographic areas rather than discrete commercial or governmental entities. In this instance, the "New York City" (NYC) POI can serve to extract additional details from the user to answer the user's query. The NYC POI can be represented by a representation image 501 selected to indicate that the POI being represented is a particular geographic area.

More specifically, the NYC POI can generate a first set of textual content 502 which can be provided to the user within the chat interface 128. Based on the clarifying question from the NYC POI, the user can provide a response 504 in the same manner. The response 504 can specify that the user wishes to eat pizza. However, the density of pizza restaurants is relatively high, and as such, the POI selector 132 will unlikely be able to select a specific pizza restaurant POI to represent due to the number of possible choices for the user.

Instead, the POI selector 132 can select a specific POI type (e.g., a pizza restaurant), and form a grouping of close-by POIs of the same POI type that can collectively converse with the user. The grouping of POIs can be represented with a representational image 505 (e.g., a pizza slice) that can visually indicate to the user that the user is conversing with a grouping of POIs, rather than a particular POI. The model representing the grouping of POIs can process the response 504, the query 131, and the first set of textual content 502 to generate a second set of textual content 506. The second set of textual content 506 can further serve to clarify the user's intent. In particular, the second set of textual content 506 can query the user as to whether the user wishes to receive additional information.

Instead, the user can provide a third response 508. The third response 508 can request a particular type of information—in this instance, mapping information. In some implementations, the machine-learned POI-specific language model that represents the POI grouping can be trained to generate navigation-specific information (e.g., data compatible with a mapping or navigation application), and thus can process the third response 508, the second set of textual content 506, the second response 504, the first set of textual content 502, and the query 131 to generate an output 510 that includes routing information 512. The routing information 512 can be formatted for compatibility with the application instance 120. In other words, the routing information 512 can be received by the application instance 120, and the application instance 120 can implement the route described by the routing information 512.

Additionally, or alternatively, in some implementations, the output 510 can include textual content generated using the same model. For example, the machine-learned POI-specific language model that represents the POI grouping can be a multimodal model that can generate both textual content and navigation-specific content. Alternatively, in some implementations, the machine-learned POI-specific language model that represents the POI grouping can generate instructions that cause the routing information 512 to be generated. For example, the machine-learned POI-specific language model that represents the POI grouping can generate instructions that instruct the application instance 120 to generate a route from the user's current location to a desired destination.

Additionally, or alternatively, in some implementations, the POI selector 132 can select another application and can provide an application integration within the interface 128. For example, the POI selector 132 can select a food delivery application, and can provide a message within the interface 128 that includes an element 514 that, when selected, causes the user computing device 112 to display an interface associated with the food delivery application. Additionally, the application instance 120 can provide relevant information (e.g., a selected pizza restaurant) to the delivery application (e.g., via APIs, etc.).

Figure 6A:
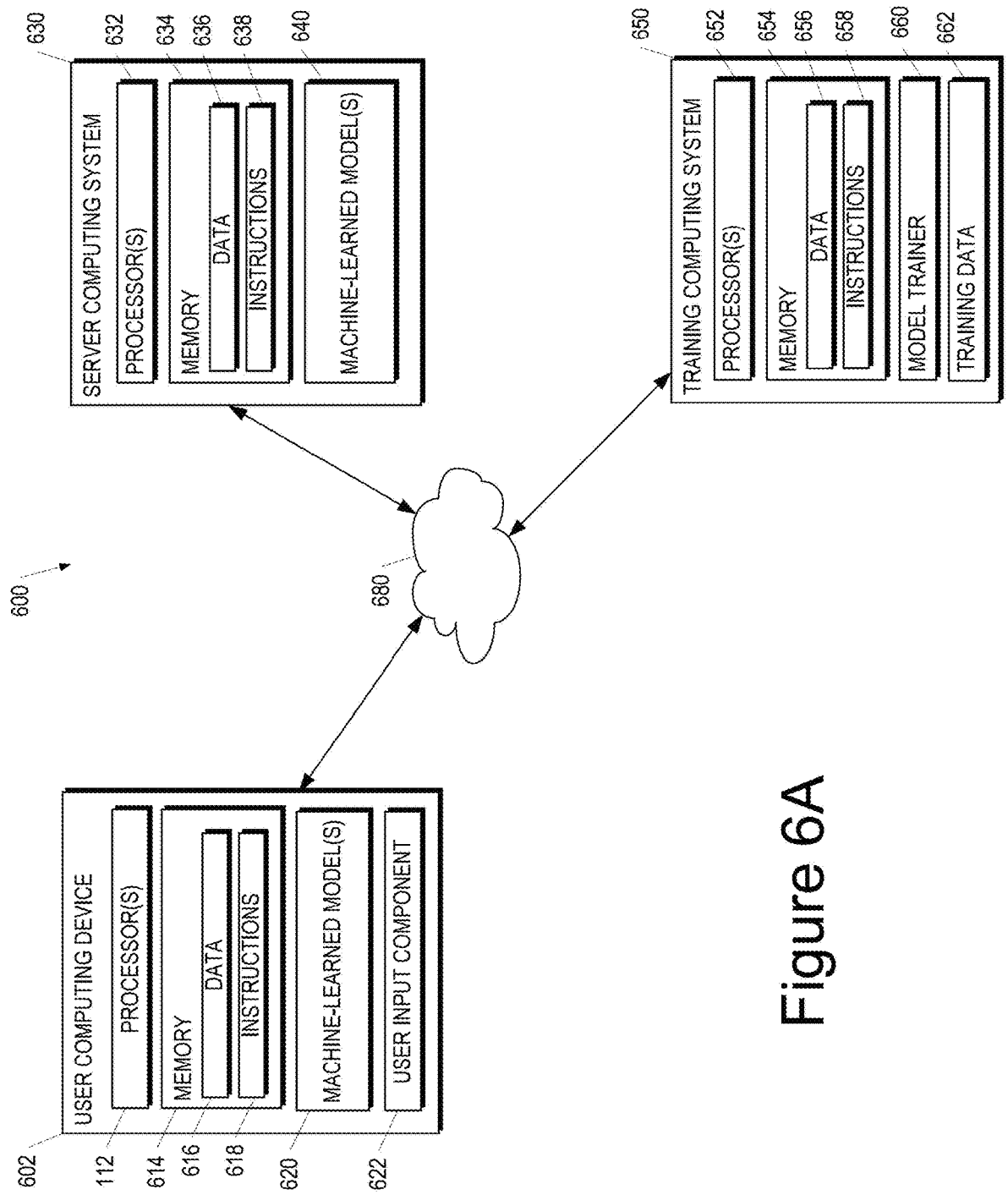
FIG. 6A depicts a block diagram of an example computing system that emulates conversational interactions between POIs according to some implementations of the present disclosure.

FIG. 6A depicts a block diagram of an example computing system 600 that emulates conversational interactions between POIs according to some implementations of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, an FPGA, a controller, a microcontroller, etc.) and can be one processor or a plurality of processors that are operatively connected. The memory 614 can include one or more non-transitory computer-readable storage media, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more machine-learned POI-specific language models 620. For example, the machine-learned POI-specific language models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned POI-specific language models 620 can be received from the server computing system 630 over network 680, stored in the user computing device memory 614, and then used or otherwise implemented by the one or more processors 612. In some implementations, the user computing device 602 can implement multiple parallel instances of a single machine-learned POI-specific language model 620.

Additionally or alternatively, one or more machine-learned POI-specific language models 640 can be included in or otherwise stored and implemented by the server computing system 630 that communicates with the user computing device 602 according to a client-server relationship. For example, the machine-learned POI-specific language models 640 can be implemented by the server computing system 630 as a portion of a web service (e.g., a navigation service, a visual search service, etc.). Thus, one or more models 620 can be stored and implemented at the user computing device 602 and/or one or more models 640 can be stored and implemented at the server computing system 630.

The user computing device 602 can also include one or more user input components 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, an FPGA, a controller, a microcontroller, etc.) and can be one processor or a plurality of processors that are operatively connected. The memory 634 can include one or more non-transitory computer-readable storage media, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned POI-specific language models 640. For example, the models 640 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, an FPGA, a controller, a microcontroller, etc.) and can be one processor or a plurality of processors that are operatively connected. The memory 654 can include one or more non-transitory computer-readable storage media, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 660 can perform a number of generalization techniques (e.g., weight decays, dropouts, etc.) to improve the generalization capability of the models being trained. In particular, the model trainer 660 can train the machine-learned POI-specific language models 620 and/or 640 based on a set of training data 662.

In some implementations, if the user has provided consent, the training examples can be provided by the user computing device 602. Thus, in such implementations, the model 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM, hard disk, or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 6A illustrates one example computing system that can be used to implement the present disclosure. Other computing systems can be used as well. For example, in some implementations, the user computing device 602 can include the model trainer 660 and the training dataset 662. In such implementations, the models 620 can be both trained and used locally at the user computing device 602. In some of such implementations, the user computing device 602 can implement the model trainer 660 to personalize the models 620 based on user-specific data.

Figure 6B:
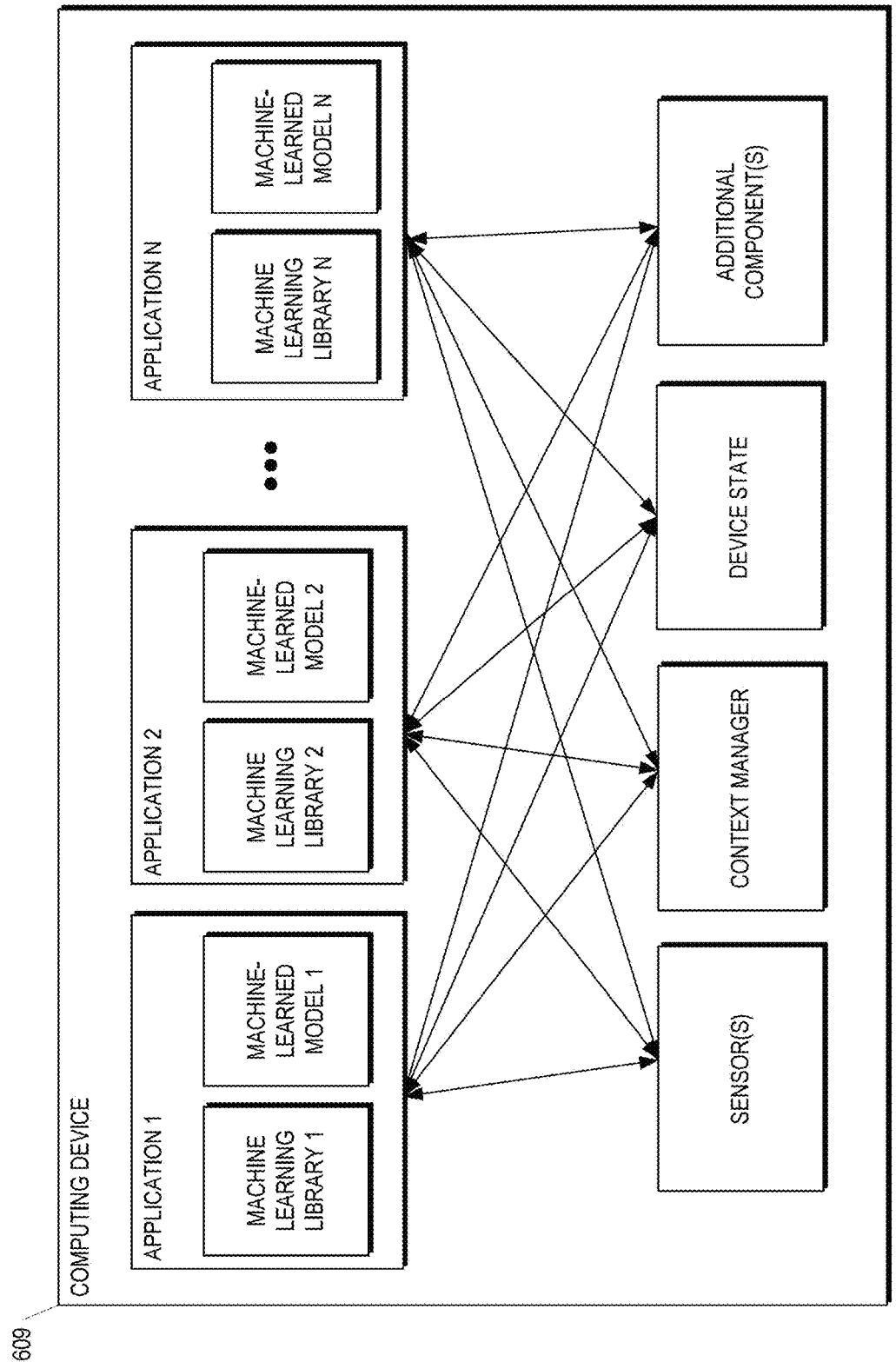
FIG. 6B depicts a block diagram of an example computing device that performs optimizing of machine-learned models to generate textual content from the perspective of particular POIs according to example embodiments of the present disclosure.

FIG. 6B depicts a block diagram of an example computing device 609 that performs optimizing of machine-learned models to generate textual content from the perspective of particular POIs according to example embodiments of the present disclosure. The computing device 609 can be a user computing device or a server computing device.

The computing device 609 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
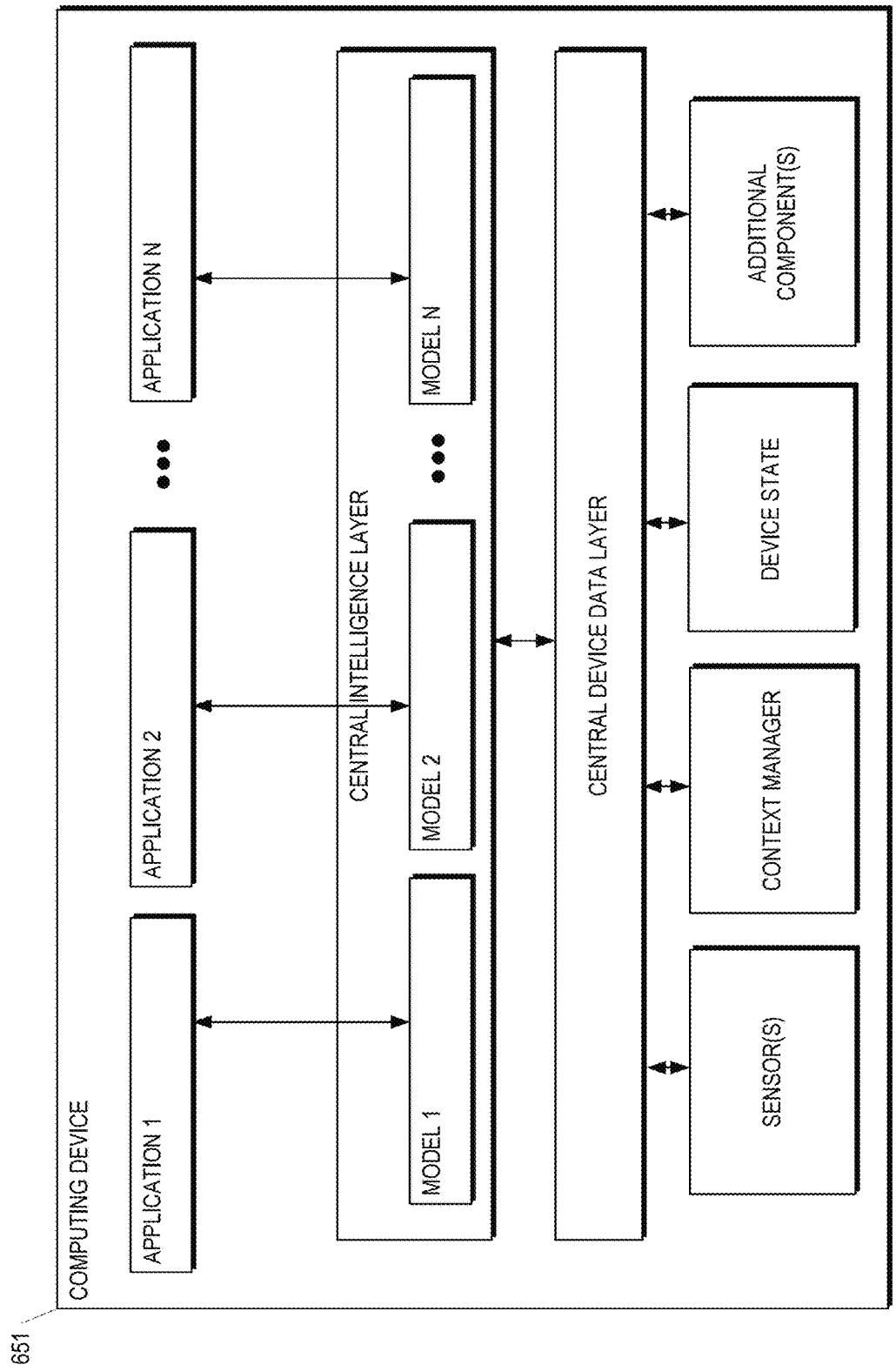
FIG. 6C depicts a block diagram of an example computing device that emulates conversational interactions between POIs according to example embodiments of the present disclosure.

FIG. 6C depicts a block diagram of an example computing device 651 that emulates conversational interactions between POIs according to example embodiments of the present disclosure. The computing device 651 can be a user computing device or a server computing device.

The computing device 651 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 651.

The central intelligence layer can communicate with a central device data layer. The central device data layer can be a centralized repository of data for the computing device 651. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 7:
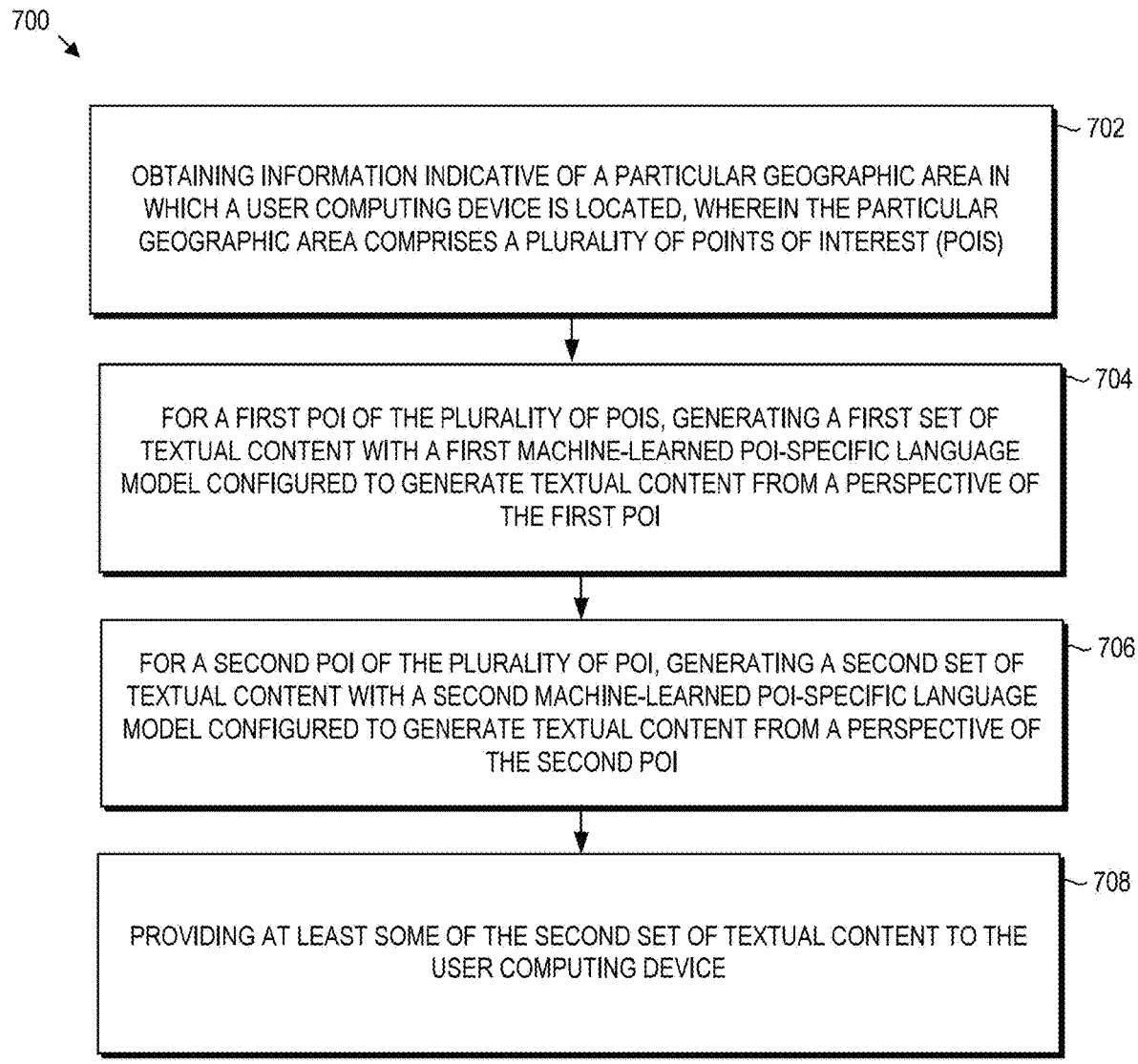
FIG. 7 depicts a flow chart diagram of an example method to perform conversational interactions between POI(s) and a user according to example embodiments of the present disclosure.

FIG. 7 depicts a flow chart diagram of an example method to perform conversational interactions between POI(s) and a user according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain information indicative of a particular geographic area in which a user computing device is located, wherein the particular geographic area comprises a plurality of POIs. In some implementations, the computing system can obtain information indicative of a first user input received at the user computing device. The first input can select the particular geographic area, the first POI, the second POI, etc. The first set of inputs can include the information indicative of the first user input. In some implementations, the first user input is indicative of a query, and the first set of textual content is descriptive of a first response to the query.

At 704, the computing system can, for a first POI of the plurality of POIs, generate a first set of textual content with a first machine-learned POI-specific language model configured to generate textual content from a perspective of the first POI.

In some implementations, the information indicative of the particular geographic area further comprises information indicative of a current location of the user computing device. Prior to generating the first set of textual content, the computing system can select the first POI of the plurality of POIs based at least in part on a distance between the current location of the user computing device and a location of the POI.

In some implementations, the first machine-learned POI-specific language model can be, or otherwise include, a first instance of a Large Foundational Model (LFM) trained at least in part to perform multiple types of language tasks. Prior to generating the first set of textual content, the computing system can apply a tuning process to the first instance of the LFM, wherein the tuning process is configured to cause the first instance of the LFM to generate textual content from the perspective of the first POI.

In some implementations, generating the first set of textual content includes retrieving POI-specific contextual information indicative of one or more characteristics of the first POI. In some implementations, the one or more characteristics of the first POI can include one or more hours of operation for the POI. In some implementations, the one or more characteristics of the first POI can include user-generated content submitted for the POI. In some implementations, the one or more characteristics of the first POI can include regional differences for services or goods provided by the POI. For example, the one or more characteristics of the first POI may indicate that the POI is located in a geographic region that uses the phrase "soda," while the characteristic(s) for a second POI may indicate that the POI is located in a geographic region that uses the phrase "pop." Other regional characteristics can be language related (e.g., language patterns, sayings, phrases, etc.), service-related (e.g., types of goods or services preferred within a region, etc.), geographic or weather related (e.g., typical climate for the area, predicted weather patterns for the area, etc.). In some implementations, the one or more characteristics of the first POI can include a location of the POI. In some implementations, the one or more characteristics of the first POI can include a semantic description of the POI.

The computing system can process a first set of inputs with the first machine-learned POI-specific language model to obtain the first set of textual content. The first set of inputs can include the first POI-specific contextual information. In some implementations, the first set of inputs can include a prompt descriptive of instructions to generate textual content from the perspective of the first POI.

In some implementations, generating the second set of textual content with the second machine-learned POI-specific language model includes processing, by the computing system, the first user input and the first set of textual content with the second machine-learned POI-specific language model to obtain the second set of textual content. The second set of textual content can be descriptive of a second response that responds to one or more of the query or the first response. In some implementations, the computing system can process the second set of textual content with the first machine-learned POI-specific language model to obtain a third set of textual content. The third set of textual content can be descriptive of a response to the second set of textual content. The computing system can provide at least some of the second set of textual content to the user computing device.

In some implementations, prior to generating the second set of textual content, the computing system can select the second POI of the plurality of POIs based on one or more selection criteria. In some implementations, the one or more selection criteria can include a location of the second POI, operating hours of the second POI, a POI type associated with the second POI, user-generated content submitted for the second POI, historic user POI preferences, etc.

In some implementations, the computing system can provide at least some of the first set of textual content to the user computing device. To do so, the computing system can obtain a first representative POI image that represents the first POI. The computing system can provide first display information to the user computing device. The first display information can include the at least some of the first set of textual content, the first representative POI image, instructions to represent the first POI with the first representative POI image within a chat interface of an application executed by the user computing device, instructions to display the at least some of the first set of textual content as a message sent by the first POI within the chat interface of the application, etc. In some implementations, the computing system can process user-generated content submitted for the POI with a machine-learned generative image model to obtain the first representative POI image.

In some implementations, the computing system can receive, from the user computing device, information indicative of a user input responsive to the first set of textual content. The computing system can generate the second set of textual content with the second machine-learned POI-specific language model by processing a second set of inputs with the second machine-learned POI-specific language model to obtain the second set of textual content. The second set of inputs can include one or more of the at least some of the first set of textual content and the user input. In some implementations, the user input can include textual content input via the chat interface of the application executed by the user computing device. The textual content input via the chat interface can be displayed as a message sent by the user within the chat interface of the application. In some implementations, the user input can include visual content and/or audio content.

At 706, the computing system can, for a second POI of the plurality of POIs, generate a second set of textual content with a second machine-learned POI-specific language model configured to generate textual content from a perspective of the second POI. In some implementations, the computing system can generate the second set of textual content with the second machine-learned POI-specific language model for a subset of POIs from the plurality of POIs. The subset of POIs can include the second POI and a third POI. The second POI and the third POI can share a particular POI type of a plurality of POI types. The second machine-learned POI-specific language model can be configured to generate content from the perspective of a group of POIs that share the particular POI type. In some implementations, the instructions to represent the second POI with the second representative POI image can include instructions to represent the subset of POIs with an avatar image based on the second representative POI image within the chat interface of the application executed by the user computing device.

In some implementations, the computing system can generate the second set of textual content with the second machine-learned POI-specific language model. Specifically, the computing system can, for a third POI of the plurality of POIs, generate additional textual content with a third machine-learned POI-specific language model configured to generate textual content from a perspective of the third POI. The computing system can append the additional textual content to the second set of textual content.

At 708, the computing system can provide at least some of the second set of textual content to the user computing device. In some implementations, providing the least some of the second set of textual content to the user computing device can include obtaining a second representative POI image that represents the second POI. The computing system can provide second display information to the user computing device. The second display information can include the at least some of the second set of textual content, the second representative POI image, instructions to represent the second POI with the second representative POI image within the chat interface of the application executed by the user computing device, instructions to display the at least some of the second set of textual content as a message sent by the second POI within the chat interface of the navigation application, etc.

In some implementations, providing the at least some of the second set of textual content to the user computing device can include providing navigation information to the user computing device. The navigation information can include routing information indicative of a route from a current location of the user computing device to the second POI.

Figure 8:
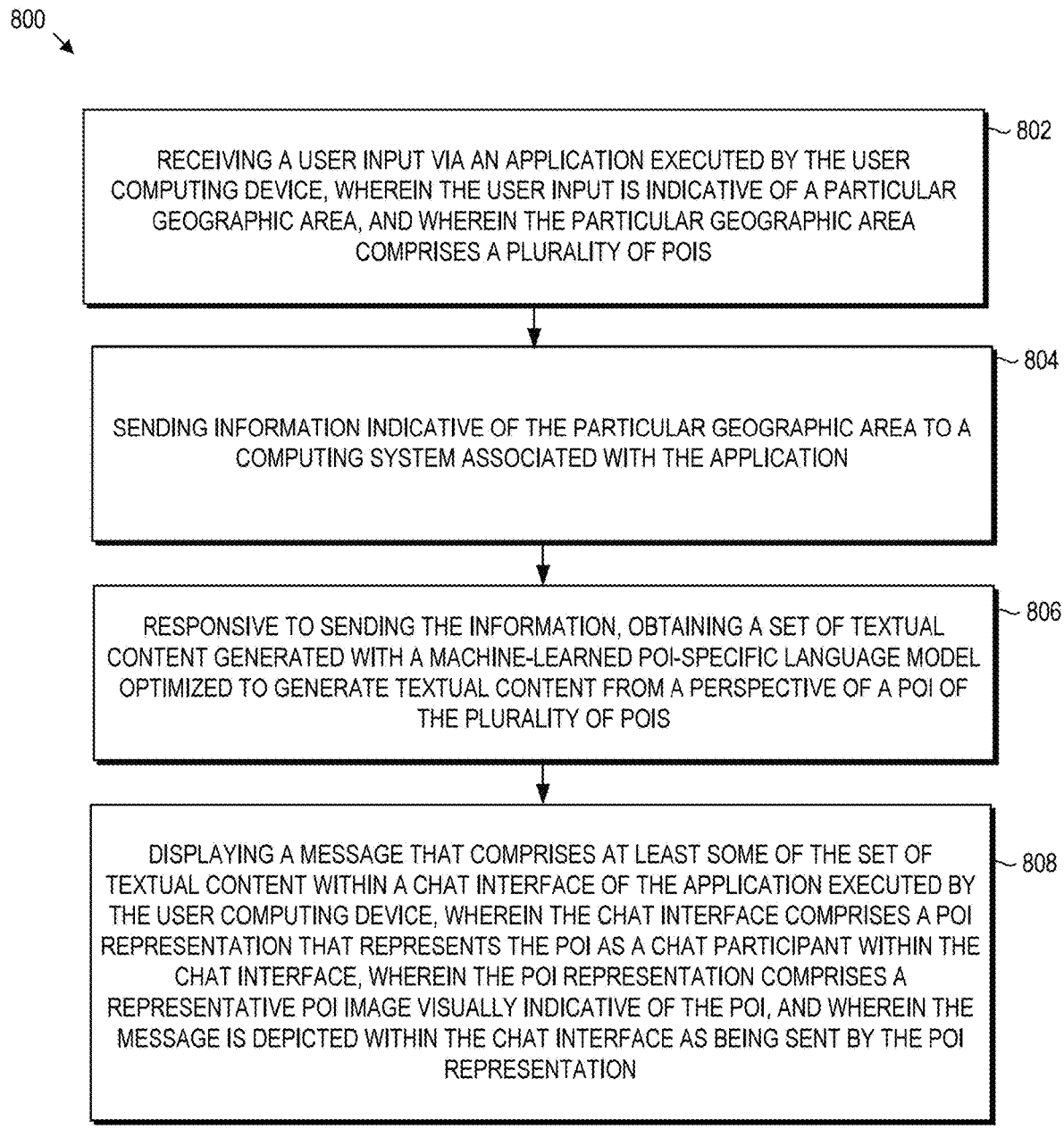
FIG. 8 depicts a flow chart diagram of an example method to perform conversational interactions between a POI and a user according to example embodiments of the present disclosure.

FIG. 8 depicts a flow chart diagram of an example method to perform conversational interactions between a POI and a user according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a user computing device can receive a user input via an application executed by the user computing device. The user input can be indicative of a particular geographic area. The particular geographic area can include a plurality of POIs.

At 804, the user computing device can send information indicative of the particular geographic area to a computing system associated with the application. In some implementations, sending the information indicative of the particular geographic area to a computing system associated with the application can include determining a current location of the user computing device, and sending information indicative of the current location of the user computing device to the computing system.

In some implementations, the application executed by the user computing device can be, or otherwise include, a navigation application. Sending the information indicative of the particular geographic area to the computing system associated with the application can include receiving a user selection input via the navigation application that selects the particular geographic region.

At 806, the user computing device can, responsive to sending the information, obtain a set of textual content generated with a machine-learned POI-specific language model optimized to generate textual content from a perspective of a POI of the plurality of POIs. In some implementations, the user computing device can receive, from the computing system, the set of textual content generated by the computing system with the machine-learned POI-specific language model configured to generate textual content from the perspective of a POI of the plurality of POIs.

In some implementations, to obtain the set of textual content, the user computing device can generate the first set of textual content with a particular machine-learned model optimized to generate textual content from the perspective of the POI of the plurality of POIs, The particular machine-learned model can be, or otherwise include, the machine-learned POI-specific language model, a machine-learned POI-specific distillation model trained via distillation from the machine-learned POI-specific language model, etc.

At 808, the user computing device can display a message that includes at least some of the set of textual content within a chat interface of the application executed by the user computing device. The chat interface can be a POI representation that represents the POI as a chat participant within the chat interface. The POI representation can include a representative POI image visually indicative of the POI. The message can be depicted within the chat interface as being sent by the POI representation.

In some implementations, the user computing device can receive a second set of textual content generated with a second machine-learned POI-specific language model optimized to generate textual content from a perspective of a second POI of the plurality of POIs. The user computing device can display a second message that comprises at least some of the second set of textual content within the chat interface of the application executed by the user computing device. The chat interface can include a second POI representation that represents the second POI as a chat participant within the chat interface. The second POI representation can include a second representative POI image visually indicative of the second POI. The second message can be depicted within the chat interface as being sent by the second POI representation.

In some implementations, prior to receiving the second set of textual content, the computing system can receive a second user input via the chat interface of the application executed by the user computing device. In some implementations, the second user input can include textual content indicative of the second POI. In some implementations, the at least some of the set of textual content is descriptive of a good or service offered by the first POI. The second user input can include textual content descriptive of a request for goods or services offered by POIs other than the first POI. The at least some of the second set of textual content can be descriptive of a good or service offered by the second POI. Implementations Various implementations described herein above are provided below:

Implementation 1: A user computing device, comprising:
one or more processor devices; and
one or more tangible, non-transitory computer readable media storing computer-readable instructions that when executed by the one or more processor devices cause the one or more processor devices to perform operations, the operations comprising:
receiving a user input via an application executed by the user computing device, wherein the user input is indicative of a particular geographic area, and wherein the particular geographic area comprises a plurality of POIs;
sending information indicative of the particular geographic area to a computing system associated with the application;
responsive to sending the information, obtaining a set of textual content generated with a machine-learned POI-specific language model optimized to generate textual content from a perspective of a POI of the plurality of POIs; and
displaying a message that comprises at least some of the set of textual content within a chat interface of the application executed by the user computing device, wherein the chat interface comprises a POI representation that represents the POI as a chat participant within the chat interface, wherein the POI representation comprises a representative POI image visually indicative of the POI, and wherein the message is depicted within the chat interface as being sent by the POI representation.

Implementation 2: The user computing device of implementation 24, wherein the operations further comprise:
receiving, from the computing system, a second set of textual content generated with a second machine-learned POI-specific language model optimized to generate textual content from a perspective of a second POI of the plurality of POIs; and
displaying a second message that comprises at least some of the second set of textual content within the chat interface of the application executed by the user computing device, wherein the chat interface comprises a second POI representation that represents the second POI as a chat participant within the chat interface, wherein the second POI representation comprises a second representative POI image visually indicative of the second POI, and wherein the second message is depicted within the chat interface as being sent by the second POI representation.

Implementation 3: the user computing device of implementation 2, wherein the at least some of the second set of textual content is responsive to the at least some of the set of textual content.

Implementation 4: the user computing device of implementation 2, wherein, prior to receiving the second set of textual content, the operations comprise:
receiving a second user input via the chat interface of the application executed by the user computing device.

Implementation 5: the user computing device of implementation 4, wherein the second user input comprises textual content indicative of the second POI.

Implementation 6: the user computing device of implementation 4, wherein:
the at least some of the set of textual content is descriptive of a good or service offered by the POI;
wherein the second user input comprises textual content descriptive of a request for goods or services offered by POIs other than the POI; and
wherein the at least some of the second set of textual content is descriptive of a good or service offered by the second POI.

Implementation 7: The user computing device of implementation 1, wherein obtaining the set of textual content comprises:
receiving, from the computing system, the set of textual content generated by the computing system with the machine-learned POI-specific language model optimized to generate textual content from the perspective of a POI of the plurality of POIs.

Implementation 8: the user computing device of implementation 1, wherein obtaining the set of textual content comprises:
generating the set of textual content with a particular machine-learned model configured to generate textual content from the perspective of the POI of the plurality of POIs, wherein the particular machine-learned model comprises:
the machine-learned POI-specific language model; or
a machine-learned POI-specific distillation model trained via distillation from the machine-learned POI-specific language model.

Implementation 9: the user computing device of implementation 1, wherein sending the information indicative of the particular geographic area to a computing system associated with the application comprises:
determining a current location of the user computing device; and
sending information indicative of the current location of the user computing device to the computing system.

Implementation 10: the computing system of implementation 1, wherein:
the application executed by the user computing device comprises a navigation application; and wherein sending the information indicative of the particular geographic area to the computing system associated with the application comprises:
receiving a user selection input via the navigation application that selects the particular geographic area.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
obtaining, by a computing system comprising one or more processor devices, information indicative of a particular geographic area in which a user computing device is located, wherein the particular geographic area comprises a plurality of Points of Interest (POIs);
for a first POI of the plurality of POIs:
applying, by the computing system, a tuning process to a first instance of a Large Foundational Model (LFM), wherein the first machine-learned POI-specific language model comprises the first instance of the LFM trained at least in part to perform multiple types of language tasks, and wherein the tuning process is configured to cause the first instance of the LFM to generate textual content from a perspective of the first POI; and
generating, by the computing system, a first set of textual content with the first machine-learned POI-specific language model configured to generate textual content from the perspective of the first POI;

for a second POI of the plurality of POIs:
   generating, by the computing system, a second set of textual content with a second machine-learned POI-specific language model configured to generate textual content from a perspective of the second POI; and
   providing, by the computing system, at least some of the second set of textual content to the user computing device.

2. The computer-implemented method of claim 1, wherein generating the first set of textual content with the first machine-learned POI-specific language model comprises:
   retrieving, by the computing system, first POI-specific contextual information indicative of one or more characteristics of the first POI; and
   processing, by the computing system, a first set of inputs with the first machine-learned POI-specific language model to obtain the first set of textual content, wherein the first set of inputs comprises the first POI-specific contextual information.

3. The computer-implemented method of claim 2, wherein the one or more characteristics of the first POI comprise one or more of:
   hours of operation for the POI;
   user-generated content submitted for the POI;
   regional differences for services or goods provided by the POI;
   a location of the POI; or
   a textual description of the POI.

4. The computer-implemented method of claim 2, wherein the first set of inputs comprises a prompt, and wherein the prompt is descriptive of instructions to generate textual content from the perspective of the first POI.

5. The computer-implemented method of claim 2, wherein obtaining the information indicative of the particular geographic area comprises:
   obtaining, by the computing system, information indicative of a first user input received at the user computing device, wherein the first user input selects at least one of:
   the particular geographic area;
   the first POI; or
   the second POI; and
     wherein the first set of inputs further comprises the information indicative of the first user input.

6. The computer-implemented method of claim 5, wherein:
   the first user input is indicative of a query; and
   the first set of textual content is descriptive of a first response to the query.

7. The computer-implemented method of claim 6, wherein generating the second set of textual content with the second machine-learned POI-specific language model comprises:
   processing, by the computing system, the first user input and the first set of textual content with the second machine-learned POI-specific language model to obtain the second set of textual content, wherein the second set of textual content is descriptive of a second response that responds to one or more of the query or the first response.

8. The computer-implemented method of claim 7, wherein the method further comprises:
   processing, by the computing system, the second set of textual content with the first machine-learned POI-specific language model to obtain a third set of textual content, wherein the third set of textual content is descriptive of a response to the second set of textual content; and
   providing, by the computing system, at least some of the second set of textual content to the user computing device.

9. The computer-implemented method of claim 8, wherein generating the first set of textual content with the first machine-learned POI-specific language further comprises:
   providing, by the computing system, at least some of the first set of textual content to the user computing device;
   obtaining, by the computing system, a first representative POI image that represents the first POI; and
   providing, by the computing system, first display information to the user computing device, wherein the first display information comprises:
   the at least some of the first set of textual content;
   the first representative POI image;
   instructions to represent the first POI with the first representative POI image within a chat interface of an application executed by the user computing device; and
   instructions to display the at least some of the first set of textual content as a message sent by the first POI within the chat interface of the application.

10. The computer-implemented method of claim 9, wherein providing the first display information to the user computing device further comprises:
   receiving, by the computing system from the user computing device, information indicative of a user input responsive to the first set of textual content; and
   wherein generating the second set of textual content with the second machine-learned POI-specific language model comprises:
     processing, by the computing system, a second set of inputs with the second machine-learned POI-specific language model to obtain the second set of textual content, wherein the second set of inputs comprises one or more of:
     the at least some of the first set of textual content; and
     the user input.

11. The computer-implemented method of claim 9, wherein providing the least some of the second set of textual content to the user computing device comprises:
   obtaining, by the computing system, a second representative POI image that represents the second POI; and
   providing, by the computing system, second display information to the user computing device, wherein the second display information comprises:
   the at least some of the second set of textual content;
   the second representative POI image;
   instructions to represent the second POI with the second representative POI image within the chat interface of the application executed by the user computing device; and
   instructions to display the at least some of the second set of textual content as a message sent by the second POI within the chat interface of the application executed by the user computing device.

12. The computer-implemented method of claim 11, wherein generating the second set of textual content for the second POI comprises:
   generating, by the computing system, the second set of textual content with the second machine-learned POI-specific language model for a subset of POIs from the plurality of POIs, wherein the subset of POIs comprises the second POI and a third POI, wherein the second POI and the third POI share a particular POI type of a plurality of POI types, and wherein the second machine-learned POI-specific language model is configured to generate content from the perspective of a group of POIs that share the particular POI type.

13. The computer-implemented method of claim 12, wherein the instructions to represent the second POI with the second representative POI image comprise instructions to represent the subset of POIs with an avatar image based on the second representative POI image within the chat interface of the application executed by the user computing device.

14. The computer-implemented method of claim 9, wherein obtaining the first representative POI image that represents the first POI comprises:
  processing, by the computing system, user-generated content submitted for the POI with a machine-learned generative image model to obtain the first representative POI image.

15. The computer-implemented method of claim 1, wherein generating the second set of textual content with the second machine-learned POI-specific language model further comprises:
  for a third POI of the plurality of POIs, generating, by the computing system, additional textual content with a third machine-learned POI-specific language model configured to generate textual content from a perspective of the third POI; and
  appending, by the computing system, the additional textual content to the second set of textual content.

16. The computer-implemented method of claim 1, wherein the information indicative of the particular geographic area further comprises information indicative of a current location of the user computing device;
  wherein, prior to generating the first set of textual content, the method comprises:
    selecting, by the computing system, the first POI of the plurality of POIs based at least in part on a distance between the current location of the user computing device and a location of the POI; and
  wherein, prior to generating the second set of textual content, the method comprises:
    selecting, by the computing system, the second POI of the plurality of POIs based on one or more selection criteria, wherein the one or more selection criteria comprise at least one of:
      a location of the second POI;
      operating hours of the second POI;
      a POI type associated with the second POI;
      user-generated content submitted for the second POI; or
      historic user POI preferences.

17. The computer-implemented method of claim 1, wherein providing the at least some of the second set of textual content to the user computing device comprises:
  providing, by the computing system, navigation information to the user computing device, wherein the navigation information comprises:
    routing information indicative of a route from a current location of the user computing device to the second POI.

18. One or more tangible, non-transitory computer readable media storing computer-readable instructions that when executed by one or more processor devices cause the one or more processor devices to perform operations, the operations comprising:
  obtaining information indicative of a particular geographic area from a user computing device, wherein the particular geographic area comprises a plurality of Points of Interest (POIs);
  for a first POI of the plurality of POIs:
  applying a tuning process to a first instance of a Large Foundational Model (LFM), wherein the first machine-learned POI-specific language model comprises the first instance of the LFM trained at least in part to perform multiple types of language tasks, and wherein the tuning process is configured to cause the first instance of the LFM to generate textual content from a perspective of the first POI; and
  generating a first set of textual content with the first machine-learned POI-specific language model configured to generate textual content from a perspective of the first POI;
    for a second POI of the plurality of POIs:
      generating a second set of textual content with a second machine-learned POI-specific language model configured to generate textual content from a perspective of the second POI; and
    providing at least some of the second set of textual content to the user computing device.

19. A user computing device, comprising:
  one or more processor devices; and
  one or more tangible, non-transitory computer readable media storing computer-readable instructions that when executed by the one or more processor devices cause the one or more processor devices to perform operations, the operations comprising:
  obtaining information indicative of a particular geographic area from a user computing device, wherein the particular geographic area comprises a plurality of Points of Interest (POIs);
  for a first POI of the plurality of POIs:
  applying a tuning process to a first instance of a Large Foundational Model (LFM), wherein the first machine-learned POI-specific language model comprises the first instance of the LFM trained at least in part to perform multiple types of language tasks, and wherein the tuning process is configured to cause the first instance of the LFM to generate textual content from a perspective of the first POI; and
  generating a first set of textual content with the first machine-learned POI-specific language model configured to generate textual content from the perspective of the first POI;
    for a second POI of the plurality of POIs:
      generating a second set of textual content with a second machine-learned POI-specific language model configured to generate textual content from a perspective of the second POI; and
    providing at least some of the second set of textual content to the user computing device.

20. The user computing device of claim 19, wherein the information indicative of the particular geographic area further comprises information indicative of a current location of the user computing device;
  wherein, prior to generating the first set of textual content, the method comprises:
    selecting, by the computing system, the first POI of the plurality of POIs based at least in part on a distance between the current location of the user computing device and a location of the POI; and wherein, prior to generating the second set of textual content, the method comprises:
  selecting, by the computing system, the second POI of the plurality of POIs based on one or more selection criteria, wherein the one or more selection criteria comprise at least one of:
  a location of the second POI;
  operating hours of the second POI;
  a POI type associated with the second POI;
  user-generated content submitted for the second POI; or
  historic user POI preferences.

\* \* \* \* \*